United States Patent
Jang et al.

(10) Patent No.: US 10,338,297 B2
(45) Date of Patent: Jul. 2, 2019

(54) LIGHTING DEVICE USING LINE SHAPED BEAM

(71) Applicant: LG INNOTEK CO., LTD., Seoul (KR)

(72) Inventors: Jae Hyuk Jang, Seoul (KR); Jin Su Kim, Seoul (KR); Seung Jong Baek, Seoul (KR); Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 262 days.

(21) Appl. No.: 14/582,930

(22) Filed: Dec. 24, 2014

(65) Prior Publication Data
US 2015/0185402 A1    Jul. 2, 2015

(30) Foreign Application Priority Data

Dec. 27, 2013  (KR) ........................ 10-2013-0164892

(51) Int. Cl.
*F21V 8/00*       (2006.01)
*F21S 43/19*      (2018.01)
(Continued)

(52) U.S. Cl.
CPC ............ *G02B 6/0038* (2013.01); *F21S 43/14* (2018.01); *F21S 43/195* (2018.01); *F21S 43/239* (2018.01);
(Continued)

(58) Field of Classification Search
CPC .... F21S 48/212; F21S 48/215; F21S 48/2243; F21S 48/2268; F21S 48/2281;
(Continued)

(56) References Cited

U.S. PATENT DOCUMENTS 6,539,656 B2 *  4/2003  Maas ................... G02B 6/0036
                                                        40/546
6,827,456 B2 * 12/2004  Parker ...................... F21V 5/00
                                                        362/330
(Continued)

FOREIGN PATENT DOCUMENTS

CN        1654979         8/2005
CN        1737660         2/2006
(Continued)

OTHER PUBLICATIONS

European Search Report issued in Application No. 14200275.7 dated May 6, 2015.
(Continued)

*Primary Examiner* — Anh T Mai
*Assistant Examiner* — Arman B Fallahkhair
(74) *Attorney, Agent, or Firm* — Ked & Associates, LLP

(57) ABSTRACT

Provided is a lighting device capable of implementing optical images having desired shapes through a pattern design, the lighting device including: a light source portion having light sources; a light guide portion having a larger thickness than a height of a light emitting surface of the respective light sources and irradiating an incident beam from a side; a three-dimensional forming portion provided inside the light guide portion, on a first surface or on a second surface; and a reflective portion on the light guide portion or the three-dimensional effect forming portion, wherein the three-dimensional effect forming portion includes multiple patterns sequentially arranged and having respective inclined surfaces with inclination angles with respect to the first surface, wherein the multiple patterns guide light passing along the light guide portion into a first surface direction or a second surface direction, thereby implementing line shaped beams of a first path.

18 Claims, 14 Drawing Sheets

(51) Int. Cl.
*F21S 43/14* (2018.01)
*F21S 43/239* (2018.01)
*F21S 43/245* (2018.01)
*F21S 43/249* (2018.01)

(52) U.S. Cl.
CPC ........... *F21S 43/245* (2018.01); *F21S 43/249* (2018.01); *G02B 6/0055* (2013.01); *G02B 6/0058* (2013.01); *G02B 6/0073* (2013.01); *G02B 6/0021* (2013.01)

(58) Field of Classification Search
CPC .. G02B 6/0038; G02B 6/0055; G02B 6/0058; G02B 6/0073; G02B 6/0021; B60Q 3/002
USPC ....... 362/612, 511, 615, 607, 613, 616, 620, 362/623, 545
See application file for complete search history.

(56) References Cited

U.S. PATENT DOCUMENTS

| | | | | |
|---|---|---|---|---|
| 7,360,939 | B2* | 4/2008 | Sugiura | G02B 6/0036 349/57 |
| 7,374,327 | B2* | 5/2008 | Schexnaider | F21S 8/04 362/394 |
| 7,936,420 | B2* | 5/2011 | Kim | G02B 6/0038 349/65 |
| 8,368,844 | B2* | 2/2013 | Ishikawa | G02B 6/0016 349/65 |
| 9,274,262 | B2* | 3/2016 | Liao | G02B 6/0038 |
| 9,435,936 | B2* | 9/2016 | Chang | G02B 6/0036 |
| 9,732,939 | B2* | 8/2017 | Baek | F21S 10/005 |
| 9,766,390 | B2* | 9/2017 | Lee | G02B 6/0038 |
| 9,897,282 | B2* | 2/2018 | Lee | F21K 9/60 |
| 9,952,376 | B2* | 4/2018 | Kim | G02B 6/0053 |
| 10,151,869 | B2* | 12/2018 | Kim | G02B 6/0038 |
| 2002/0080598 | A1 | 6/2002 | Parker et al. | |
| 2005/0140860 | A1 | 6/2005 | Olczak | |
| 2006/0039670 | A1 | 2/2006 | Feng et al. | |
| 2008/0310187 | A1 | 12/2008 | Huang | |
| 2010/0142224 | A1 | 6/2010 | Zhang et al. | |
| 2010/0182802 | A1 | 7/2010 | Wang et al. | |
| 2011/0063873 | A1 | 3/2011 | Parker et al. | |
| 2012/0274462 | A1* | 11/2012 | Martinez | B60Q 1/2607 340/479 |
| 2015/0184829 | A1* | 7/2015 | Baek | F21S 10/005 362/235 |
| 2015/0185400 | A1* | 7/2015 | Lee | F21S 48/215 362/613 |
| 2015/0185401 | A1* | 7/2015 | Kim | G02B 6/0053 362/612 |
| 2015/0219827 | A1* | 8/2015 | Kim | F21S 48/2243 362/612 |
| 2015/0219913 | A1* | 8/2015 | Lee | B60K 37/02 359/462 |
| 2015/0331169 | A1* | 11/2015 | Jang | G02B 6/005 362/607 |

FOREIGN PATENT DOCUMENTS

| | | |
|---|---|---|
| DE | 103 17 062 A1 | 10/2004 |
| DE | 10 2005 060 454 A1 | 6/2007 |
| EP | 1 715 244 A1 | 10/2006 |

OTHER PUBLICATIONS

Chinese Office Action dated Aug. 2, 2017 issued in Application No. 201410836653.3 (with English Translation).
Chinese Office Action dated Nov. 15, 2018 issued in Application No. 201410836653.3.

* cited by examiner

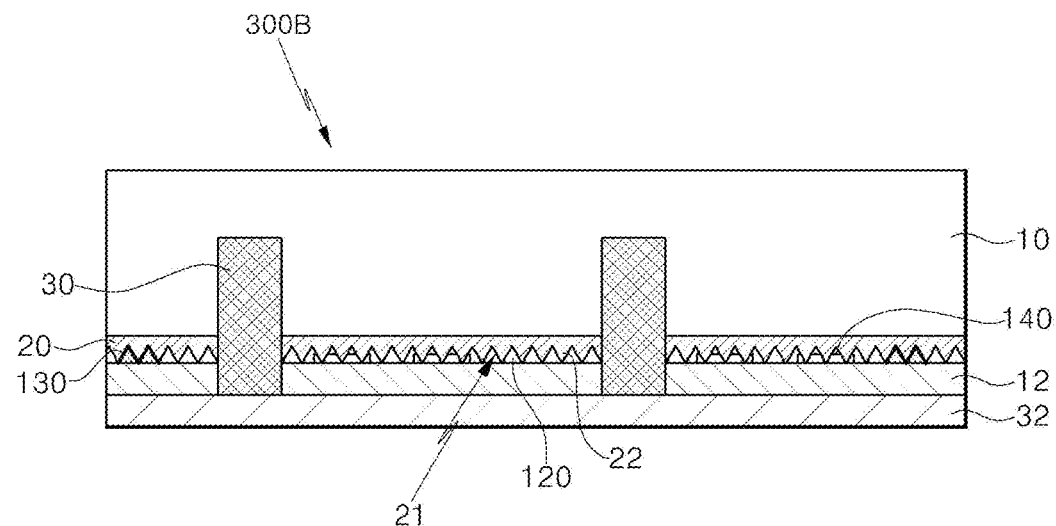
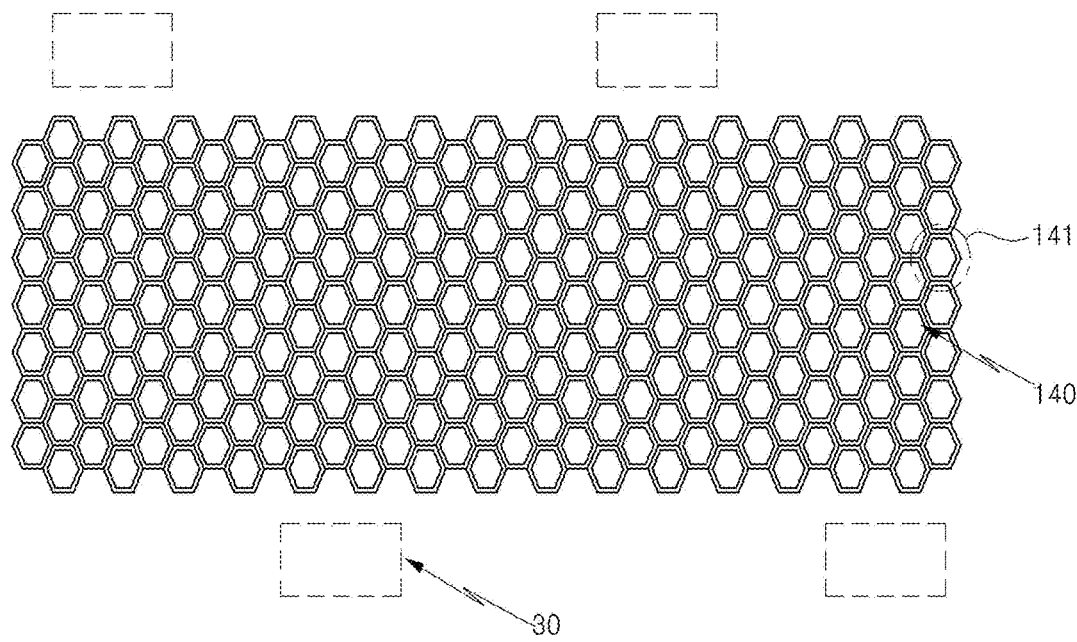
FIG. 21

LIGHTING DEVICE USING LINE SHAPED BEAM

CROSS-REFERENCE TO RELATED APPLICATION

This application claims priority under 35 U.S.C. § 119 to Korean Application No. 10-2013-0164892 filed on Dec. 27, 2013, in the Korean Intellectual Property Office, whose entire disclosure is hereby incorporated by reference.

BACKGROUND

1. Field

Embodiments of the present disclosure relate to a lighting device capable of implementing optical images having desired shapes through a pattern design.

2. Background

In general, a lighting device is a device used for lightening a dark place using various light source. The lighting device is used to shine a beam at a specific object or space and to express an atmosphere of the specific object or space in a desired shape or color.

According to the technical development of an LED (Light Emitting Diode), lighting devices in various shapes using the LED have recently come into wide use. For example, one of the lighting devices according to a conventional art includes a diffusion plate for emitting light emitted from an LED light source to the outside.

Most of the LED lighting devices according to the conventional art are configured so that light is uniformly outputted on an entire light emitting surface. Also, in order to express the atmosphere of a specific object or space in a desired shape or color, a color filter or a filter having a light permeable hole in a desired shape has been used in some lighting devices according to the conventional art.

However, when the atmosphere of a specific object or space is expressed in a desired shape or color using the LED lighting devices according to the conventional art, the configuration of the devices becomes mechanically complicated, and as a result, it is problematic in that the degree of freedom in design is limited, and it is difficult to install or maintain and manage the devices. As such, in order to express the atmosphere in a desired shape or color or an optical image, a light device having a simple structure, which is easy to install or maintain and manage, has been required.

BRIEF DESCRIPTION OF THE DRAWINGS

The embodiments will be described in detail with reference to the following drawings in which like reference numerals refer to like elements wherein:

FIG. 20 is a partially enlarged cross-sectional view having a structure which can be applied to the lighting device of FIG. 19;

FIG. 21 is a plan view showing reflective patterns which can be applied to the lighting device of FIG. 19;

DETAILED DESCRIPTION DISCLOSURE

Figure 1:
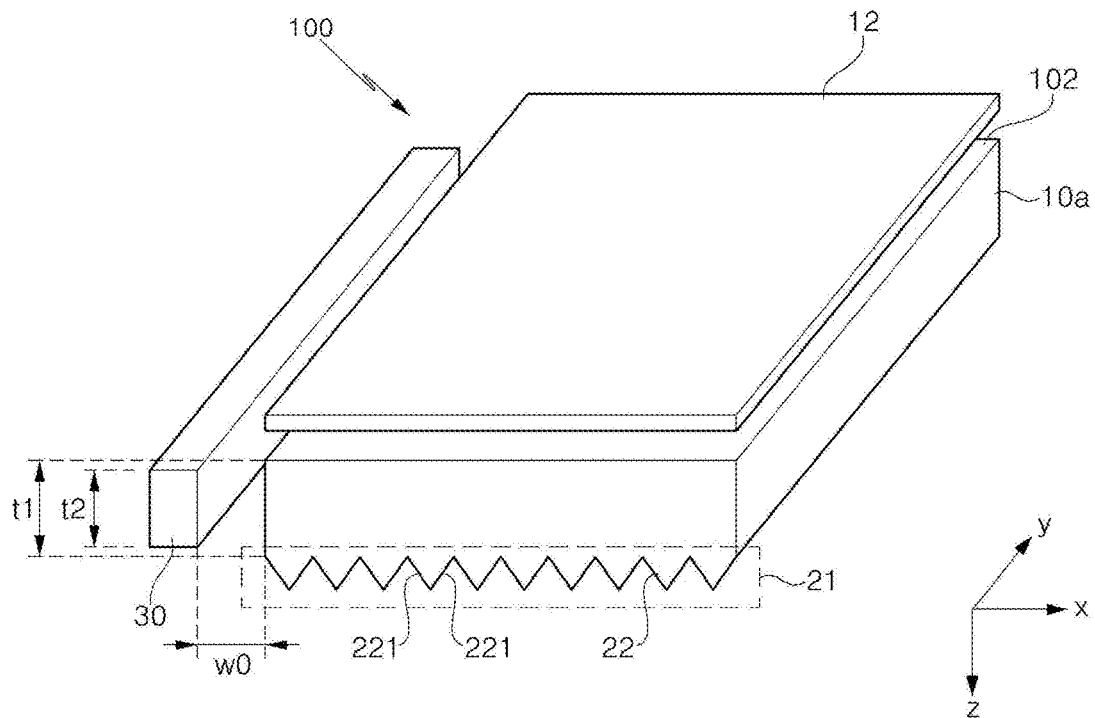
FIG. 1 is a perspective view of a lighting device according to an embodiment of the present disclosure.

Hereinafter, the embodiments of the present disclosure that an ordinary person skilled in the art can implement will be described with reference to the accompanying drawings. The embodiments in the specification and the constructions shown in the drawings are provided as a preferred embodiment of the present disclosure, and it should be understood that there may be various equivalents and modifications which could substitute at the time of filing. In addition, when it comes to the operation principle of the preferred embodiments of the present disclosure, when the known functions or functions are seemed to make unclear the subject matters of the present disclosure, they will be omitted from the descriptions of the disclosure. The terms below are defined in consideration of the functions of the present disclosure, and the meaning of each term should be interpreted by judging the whole parts of the present specification, and the elements having the similar functions and operations of the drawings are given the same reference numerals. As used herein, the singular forms "a," "an" and "the" may be intended to include the plural forms as well, unless the context clearly indicates otherwise.

Figure 2:
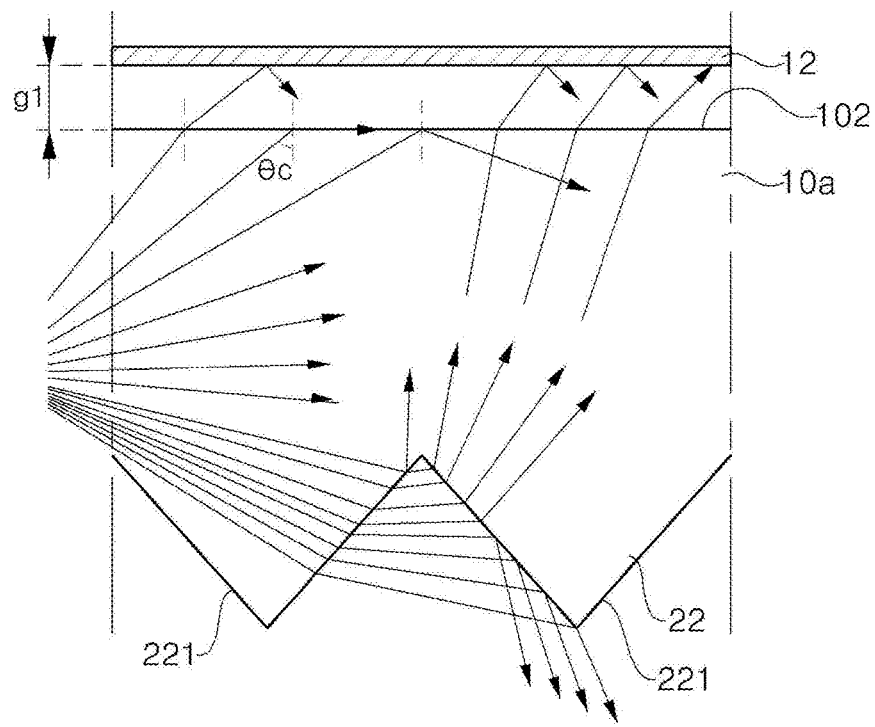
FIG. 2 is a partially enlarged cross-sectional view showing a part of the lighting device of FIG. 1.
Figure 3:
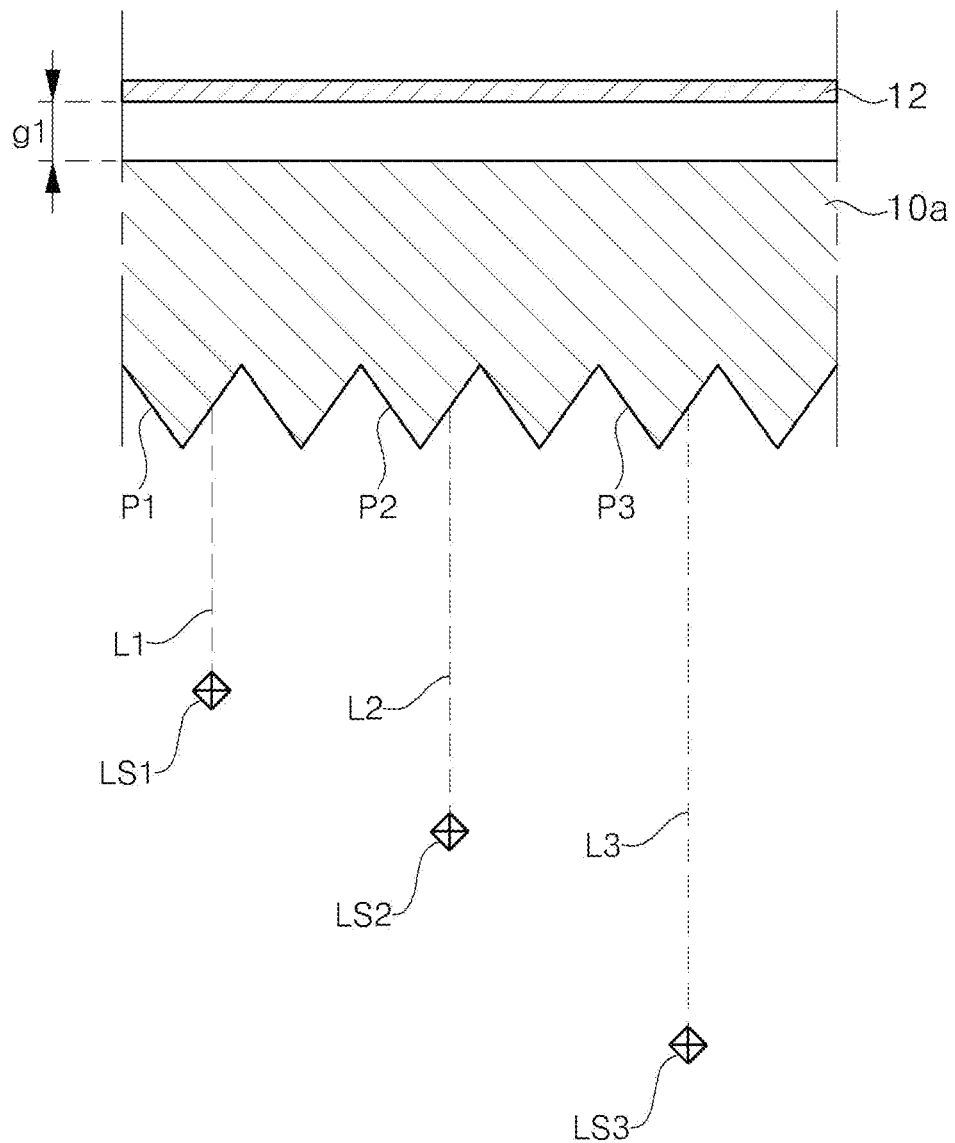
FIG. 3 is an enlarged cross-sectional view showing the other part of the lighting device shown in FIG. 1.

FIG. 1 is a perspective view of a lighting device according to an embodiment of the present disclosure. FIG. 2 is a partially enlarged cross-sectional view showing a part of the lighting device of FIG. 1. Furthermore, FIG. 3 is an enlarged cross-sectional view showing the other part of the lighting device of FIG. 1.

Referring to FIG. 1, a lighting device 100 according to the present embodiment includes: a light guide portion 10a; a reflective portion 12; a three-dimensional effect forming portion 21; and a light source portion 30.

The light guide portion 10a is provided as a transparent substrate. The light guide portion 10a may be provided as a transparent member in a plate or film form having a haze of 2% or less. Also, it is preferable that a light transmittance of the light guide portion 10a be 80% or more, but is not limited thereto. For example, the light transmittance of the light guide portion 10a may be selected from a range of about 60% or more according to a desired shape when optical images of a line shaped beam, a three-dimensional beam or a line shaped beam with a three-dimensional effect are implemented. In a case where the light transmittance of the light guide portion 10a is smaller than 60%, it may be difficult to appropriately express a line shaped beam or a beam with a three-dimensional effect.

The light guide portion 10a has a first surface (see reference numeral 101 of FIG. 8 or 12) and a second surface 102 opposite to the first surface. When the light guide portion 10a is provided in a plate or film form, the first surface and the second surface have a relatively large area compared to the other surfaces of the light guide portion 10a and become two surfaces appropriately parallel to each other. The first surface may refer to a first main surface or a pattern arrangement surface.

The light guide portion 10a may be made of glass, resin or the like. A thermoplastic polymer, a photocurable polymer or the like may be used as a material of the light guide portion 10a. More specifically, the material of the light guide portion 10a may be polycarbonate, polymethylmethacrylate, polystyrene, polyethylene terephthalate or the like, but is not limited thereto.

The light guide portion 10a may have a thickness t1 of about 0.1 mm or more and about 10.0 mm or less. When the thickness t1 of the light guide portion 10a is smaller than 0.1 mm, it is difficult to produce a height of a light emitting surface of an LED element of the light source portion 30 to be smaller than 100 μm or heavy production costs are consumed. Also, when the thickness T1 of the light guide portion 10a is larger than 10.0 mm, a thickness and a weight of the device may be increased and material costs may be also increased.

More specifically, the light guide portion 10a may have a thickness of about 100 μm or more and about 250 μm or less. In this case, the light guide portion 10a may have flexibility. Also, according to implementation, the thickness t1 of the light guide portion 10a may be in the range of about 250 μm or more and about 10.0 mm or less. In this case, since it is difficult to wind the light guide portion 10a on a roll device, the light guide portion may have a plate-like shape and may be applied to application products.

The reflective portion 12 may be provided above the first surface or the second surface 102 of the light guide portion 10a. In the present embodiment, the reflective portion 12 is disposed to be separated from the second surface 102 by a predetermined distance. The reflective portion 12 may be provided in a coating layer form or a reflective film form. In the present embodiment, the reflective portion 12 is provided in a flat reflective film form.

When the reflective portion 12 is used, by reflecting light trying to travel to the outside of the light guide portion 10a by being reflected and refracted by the multiple patterns 22 of the three-dimensional effect forming portion 21 which will be described later, and thus passing along the second surface 102 of the light guide portion 10a, the light may be returned to the inside of the light guide portion 10a. According to this configuration, a change is provided to optical images of a line shaped beam or a line shaped beam with a three-dimensional effect intended to be expressed through the three-dimensional effect forming portion 21 so that the optical images can be more clearly expressed or can be more unclearly expressed. When the reflective portion 12 is disposed, a distance g1 of the aforesaid spaced portion is designed in a range which is more than 0 and several μm or less. This is intended to prevent a line shaped beam or a line shaped beam with a three-dimensional effect from being not easily implemented by the three-dimensional effect forming portion 21 due to the unwanted scattering of light generated in the spaced portion. Of course, according to some embodiments, the reflective portion 12 may be disposed to be adhered to the second surface of the light guide portion 10a without the spaced portion.

The three-dimensional effect forming portion 21 is configured to include multiple patterns 22 provided on the first surface of the light guide portion 10a. The multiple patterns 22 have respective inclined surfaces 221 inclined with respect to the first surface and are configured to include respective concave portions or respective convex portions which are sequentially arranged in a predetermined direction (x-direction) of the first surface. In the present embodiment, each of the multiple patterns 22 has a shape formed by removing a part of the first surface of the light guide portion 10a, but is not limited thereto.

The inclined surface 221 of each pattern 22 extending to a predetermined direction (e.g., y-direction) functions to limit the incident beam reflected from the inside of the light guide portion 10a to a first path by each pattern extension direction, to guide the incident beam to a first surface direction toward which the first surface looks and a second surface direction toward which the second surface looks, and to sequentially emit the incident beam from the first path to the outside of the light guide portion 10a. In the present embodiment, a length direction of the line shaped beam may extend in the x-direction.

The inclined surface 221 limits spread reflection of the incident beam and is provided so that there is little light returned to an incidence angle. That is, the inclined surface 221 is provided to guide the incident beam to a predetermined direction by refraction and regular reflection of the incident beam.

The light source portion 30 creates an incident beam that is reflected and moves inside the light guide portion 10a by irradiating light on a side of the light guide portion 10a. The light source portion 30 may include at least one LED (Light Emitting Diode) light source. The LED light source may be provided in an LED string form or an LED package form having a single LED element or multiple LED elements. In the case where the LED light source is used, the light sources of the light source portion 30 may have a light emitting surface with a predetermined area according to each LED chip size. The light source may be intended to include the plural forms.

The light source portion 30 may be arranged to be separated from one side of the light guide portion 10a by a predetermined distance w0. In this case, a separation space therebetween may be filled with a transparent material such as resin or the like. Of course, according to some embodiments, the light source portion 30 may be configured to be closely attached to one side of the light guide portion 10a without a separation space or may be configured to be buried in an inner side of the light guide portion 10a.

The light emitting surface of the light source portion may be arranged to face the side of the light source portion 10a and may have a circular shape, an elliptical shape, a triangular shape, a quadrangular shape, a pentagonal shape or a polygonal shape. In this case, regardless of the shape of a cross section, a height of the light emitting surface may be defined as a maximum length in a thickness direction of the light guide portion 10a, and a width of the light emitting surface may be defined as a maximum length in a direction that crosses at right angles to a thickness direction in the side of the light guide portion 10a and is parallel to the light emitting surface.

A height t2 of the light source portion 30 in the thickness direction of the light guide portion 10a is smaller than the thickness t1 of the light source portion 10a. This is intended for the light guide portion 10a so as to appropriately function as a member for receiving and guiding the incident beam when light emitted from the light emitting surface of the light source portion 30 is irradiated.

According to the aforesaid configuration, the light (the incident beam) traveling inside the light guide portion 10a is guided in a first surface direction toward which the first surface looks and a second surface direction toward which the second surface 102 looks of the light guide portion 10a due to reflection and refraction generated from the inclined surfaces 221 of the multiple patterns 22 of the three-dimensional effect forming portion 21, and thanks to the guided light, the lighting device 100 implements a line shaped beam of the first path which crosses at right angles to each pattern extension direction of the multiple patterns. Of course, the incident beam guided in the second surface direction is reflected from the reflective portion 12 and is then returned to the inside of the light guide portion 10a again, and thereafter, the incident beam is refracted from the inclined surfaces 221 again and is then emitted in the first surface direction.

That is, when the multiple patterns 22 sequentially arranged and having the respective inclined surfaces 2221 are used, a line shaped beam or a line shaped beam with a three-dimensional effect may be expressed on the three-dimensional effect forming portion 21. When the respective pattern extension directions of the multiple patterns 22 are designed to desired directions, an optical path of the incident beam passing along the three-dimensional effect forming portion 21 may be limited to a path (the first path) which makes a right angle with each pattern extension direction, and an optical width and luminosity of the incident beam may be controlled in a desired shape by guiding the incident beam in the first path to be sequentially emitted in the first surface direction.

Here, the line shaped beams refer to beams generated when light irradiated to a hemisphere area (light effective area) of the three-dimensional effect forming portion 21 has a predetermined width (optical width) and a longer length than the optical width and is guided to the first path. In other words, the line shaped beams refers to beams in which the light of the first path is relatively clearly observed compared to the light of peripheral areas according to each position of a standard point and an observing point in the light effective area of the light source.

The pattern extension direction refers to a direction in which a specific straight line on the inclined surface extends, or a direction which a specific tangent line in contact with a curved line on the inclined surface extends. The pattern extension direction is designed to limit and guide the optical path for emission of light of the light source irradiating light to the multiple patterns to a desired direction, namely, the first path. That is, the extension direction of the inclined surface of each pattern is appropriately parallel to a pattern arrangement surface and is provided to extend in a direction which crosses at right angles to the first path.

The process for implementing the line shaped beam and the line shaped beam with the three-dimensional effect via the three-dimensional effect forming portion 21 will be described in greater detailed as follows.

Referring to FIG. 2, light, which meets with the inclined surface 221 of each pattern of the three-dimensional effect forming portion 21, is refracted or reflected according to each incidence angle. That is, when the incidence angle is smaller than a critical angle $\theta c$, the light passing along the light guide portion 10a penetrates the second surface 102 or the patterns 22 and is refracted according to a difference in a refractive index. Also, the light passing along the light guide portion 10a is reflected from the second surface 102 or the inclined surfaces 221 of the patterns 22 when the incidence angle is more than the critical angle $\theta c$.

The critical angle $\theta c$ refers to an incidence angle having a reflective angle of 90°, and at this time a relation between the reflective index and the critical angle is represented by following Equations 1 and 2.

$$n = \frac{n1}{n2} = \frac{\sin\theta_c}{\sin 90°} \quad \text{Equation 1}$$

$$\sin\theta_c = \frac{n1}{n2} \quad \text{Equation 2}$$

At this time, when n1 is a reflective index of air, n2 is a reflective index of a medium (light guide portion), and the reflective index of air is about 1, the critical angle and the refractive index of the medium may be represented by a relational expression as shown in following Equation 3.

$$\sin\theta_c = \frac{1}{n2} \quad \text{Equation 3}$$

For appropriate refraction and reflection of the incident beam passing along the light guide portion 10a, the lighting device according to the present embodiment is designed so that the inclined surface of each of the patterns can have a predetermined surface roughness.

That is, in the present embodiment, the inclined surface 221 may be a mirror-like finishing surface. Also, the inclined surface 221 may be a precision processing surface. As one example, with regard to the surface roughness of the inclined surface 221, even though there is a slight difference according to each processing method, a center line average roughness or an arithmetic mean roughness Ra may be about 0.02 or less, and a maximum height roughness Rmax may be about 0.3. According to some embodiments, the surface roughness of the inclined surface may be a ten point median height Rz of less than 0.8. Here, the unit of roughness may be μm and a standard length may be 0.25 mm The surface roughness of the inclined surface is intended to secure a reflectance of the inclined surface in a range beyond a predetermined value. When the surface roughness shows a larger surface roughness than the value described above, it is difficult to properly implement a line shaped beam due to the scattering of light or light beyond a fixed amount returning from the inclined surface to the light source.

The specific optical width may be limited in a desired shape through a pattern design for controlling pattern conditions, such as a between adjacent two main patterns and the like. For example, the specific optical path and the specific optical width may be implemented to extend to the extent of a first length while having a fixed width according to a pattern design, may be implemented to extend to the extent of a second length shorter than the first length while having an optical width which reduces gradually, or may be implemented to be similar to the first length or to be shorter or longer than the first length while having an optical width which increases gradually.

According to the present embodiment, a line shaped beam or a line shaped beam with a three-dimensional effect of the specific optical path may be implemented by controlling a refraction and reflection ability of the inclined surfaces 221 of the multiple patterns 22 through a pattern design for the patterns 22 of the three-dimensional forming portion 21. That is, the light passing along the multiple patterns 22 of the three-dimensional effect forming portion 21 may be limited to a specific optical path and optical width by the respective pattern extension directions of the patterns according to a pattern design, and may be implemented as a line shaped beam, a three-dimensional effect beam or a line shaped beam with a three-dimensional effect having a desired shape by sequentially emitting the incident beam in the first surface direction by refraction and reflection from the inclined surfaces.

The line shaped beam with the three-dimensional effect will be described in greater detail with reference to FIG. 3 as follows.

A first pattern P1, a second pattern P2 and a third pattern P3 are selected from the multiple patterns of the three-dimensional forming portion. The first to third patterns P1, P2, P3 are sequentially arranged at a position which is gradually further away from the light source. The first to third patterns P1, P2, P3 may be sequentially arranged patterns or patterns in which another pattern is arranged between two adjacent patterns. In this case, a second optical path from the light source to the second pattern is longer than a first optical path with respect to the first pattern, and is smaller than a third optical path with respect to the third pattern.

When the first to third patterns P1, P2 P3 of the three-dimensional forming portion are viewed from a predetermined standard point or an observing point in the first surface direction of the outside, a second distance L2 from a second dummy light source LS2 of the light source resulting from the inclined surface of the second pattern to the inclined surface of the second pattern is longer than a first distance L1 from a first dummy light source LS1 of the light source resulting from the inclined surface of the first pattern to the inclined surface of the first pattern, and is shorter than a third distance L3 from a third dummy light source LS3 of the light source resulting from the inclined surface of the third pattern to the inclined surface of the third pattern.

In other words, the multiple patterns of the three-dimensional effect forming portion serve as indirect light source which are located far away from a predetermined standard point or an observing point as each distance (corresponding to L1, L2, L3) from the light source portion 30 as viewed from the outside of the light guide portion 10a is gradually increased by refraction and reflection of each of the inclined surfaces. Here, specific parts of the optical paths of the multiple patterns serves as indirect light source, and at this time, the indirect light source is sequentially arranged along the optical paths, and as each distance from the light source is gradually increased, the indirect light source is provided as dummy light sources LS1, LS2, LS3 in which the intensity of light is reduced by being located far away from the standard point.

The line shaped beams with the three-dimensional effect may refer to optical images having a sense of distance or a perceptional depth, which is configured such that a kind of line-shape beam concentrated into a predetermined optical path (the first path) by a pattern design gradually enters the light guide portion 10a, namely, from the first surface of the light guide portion 10a toward the second surface of the light guide portion 10a, as viewed from the first surface direction or the second surface direction. The three-dimensional effect beam may be one example of a line shaped beam and may be another name for a specific optical image of the line shaped beam.

According to the present embodiment, the multiple patterns of the three-dimensional effect forming portion are operated as indirect light source in which as a distance from the light source is gradually increased by the inclined surface of each of the multiple pattern, the optical paths become longer in regular sequence and brightness becomes lower, so that the lighting device may create a three-dimensional effect beam having a sense of distance and a perceptional depth in the thickness direction of the light guide portion 10a.

Meanwhile, in the present embodiment, the multiple patterns 22 are provided by removing a part of the first surface of the light guide portion 10a in an uneven form, but the present disclosure is not limited thereto. That is, according to some embodiments, the multiple patterns 22 may be provided by a separate pattern layer bonded to the first surface or the second surface of the light guide portion 10a.

Figure 4:
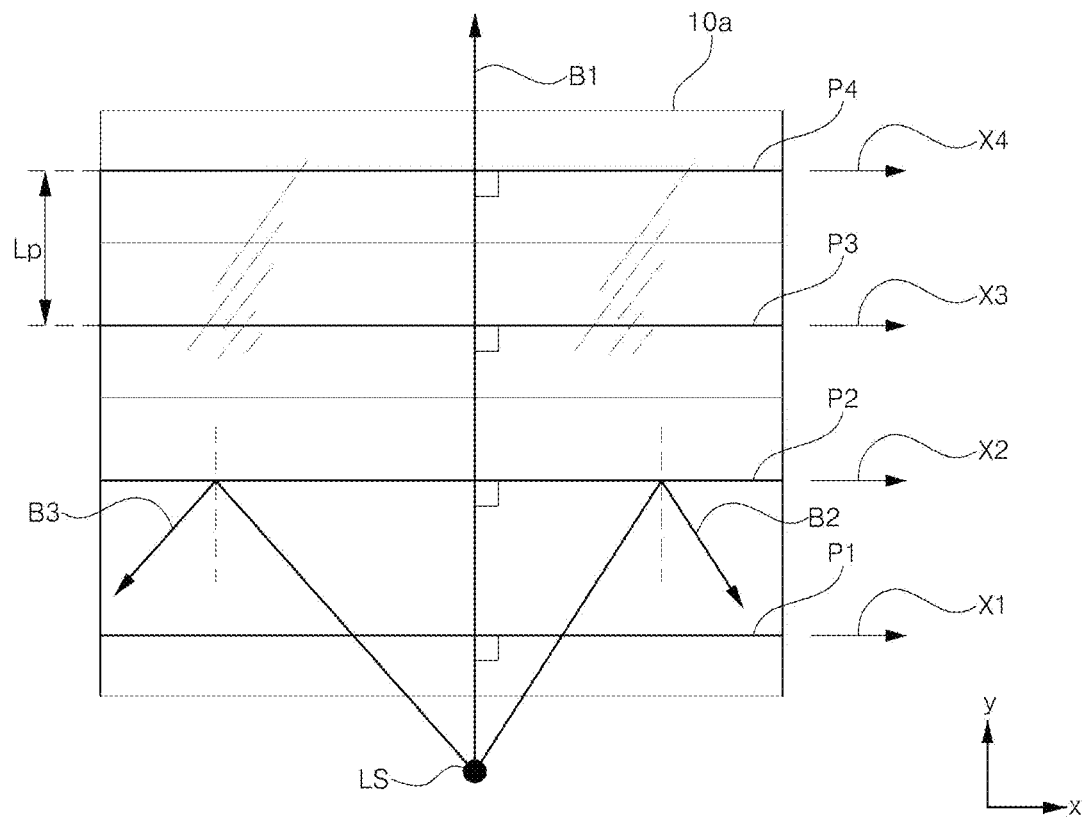
FIG. 4 is a partially enlarged plan view of the lighting device of FIG. 1.

FIG. 4 is a partially enlarged view of the lighting device of FIG. 1. FIG. 4 may correspond to a partially enlarged view of the multiple patterns as viewed to face the three-dimensional forming portion 21 of the light guide portion 10a of FIG. 1 in a state of being placed on a plane.

Referring to FIG. 4, when the multiple patterns P1, P2, P3, P4 are sequentially arranged in the y-direction with respect to the light source LS, a part (a first incident beam) of beams emitted from the light source LS is implemented as a line shaped beam B1 traveling along the first path which crosses at right angles to respective pattern extension directions x1, x2, x3, x4 of the multiple patterns P1, P2, P3, P4.

In the present embodiment, the first path is headed along the y-direction by an arrangement direction of the multiple patterns extending parallel to each other. The generation of this optical path (the first path) is based on the Fermat's principle that a ray of light passing along the three-dimensional forming portion 21, namely, a ray of light passing along a medium, travels along a movement path that can be traversed in the least time.

Also, with regard to the implementation of the line shaped beam B1 resulting from the pattern design, the multiple patterns P1, P2, P3, P4 guide a second incident beam in a direction other than the first path by refraction and reflection generated from the inclined surfaces.

Among the beams directed toward the inclined surfaces of the respective patterns, the second incident beam may be a beam (hereinafter referred to as 'an ambient beam') that meets with the inclined surfaces by roughly traveling in an inclination direction between a +y direction and a +x direction, and a +y direction and a −x direction on a plan defined by the pattern extension directions and the y-direction, and is refracted or is regularly reflected by the inclined surfaces.

Furthermore, the inclination direction may be defined as, for example, a direction toward a first quadrant and a fourth quadrant of both sides of the line-shape beam B1 in the first path that travels from the light source LS to a +y axis on an x-y plane. The x-y plane may correspond to the first surface or the second surface of the light guide portion 10.

According to the aforesaid configuration, since the second incident beam is dispersed on the respective inclined surfaces of the patterns of the three-dimensional forming portion in a relatively wide range, as viewed from an arbitrary standard point on a straight line which crosses the x-y plane, or an observing point, the second incident beam becomes an ambient beam B2, B3 passing along a peripheral portion or a dark space of the periphery of the line shaped beam that is clearly distinguished due to relatively low brightness compared to a line shaped beam portion (hereinafter referred to as 'a bright portion') resulting from the first an incident beam. According to the present embodiment, the lighting device may implement a line shaped beam by limiting and guiding a part of the incident beam from the light source to the first path, and the lighting device may distribute the rest of the incident beam to the ambient beam passing along the dark space of the periphery of the line shaped beam.

According to the present embodiment, a distance Lp (corresponding to a pitch or average distance) between two adjacent patterns may range from about 10 μm to about 500 μm This distance Lp is based on a minimum distance and a maximum distance for implementing a line shaped beam or a three-dimensional effect beam, and when the distance is beyond the range, it may be difficult to implement the line shaped beam or the three-dimensional effect beam.

Also, according to the present embodiment, each of the pattern extension directions x1, x2, x3, x4 of the multiple patterns may be a direction in which a specific straight line parallel to the first surface of the light guide portion 10a extends from each inclined surface of the multiple patterns or a direction in which a specific tangent line in contact with a curved line of each inclined surface extends. The respective pattern extension directions x1, x2, x3, x4 may be parallel to the first surface of the light guide portion 10a.

As one example, when the respective pattern extension directions x1, x2, x3, x4 of the multiple patterns P1, P2, P3, P4 are designed to be parallel to each other, the light passing along the multiple patterns is expressed as a line shaped beam in a straight line form that starts from the pattern P1 which first meets with the incident beam of the light source LS and travels to a specific optical path (the first path) which crosses at right angles to the pattern extension directions of the multiple patterns P2, P3, P4. It may be defined that a length of the line shaped beam is larger than a width of the line shaped beam, and an optical width of the line shaped beam is less than a width of the light emitting surface of the light source of the light source portion.

Figure 6:
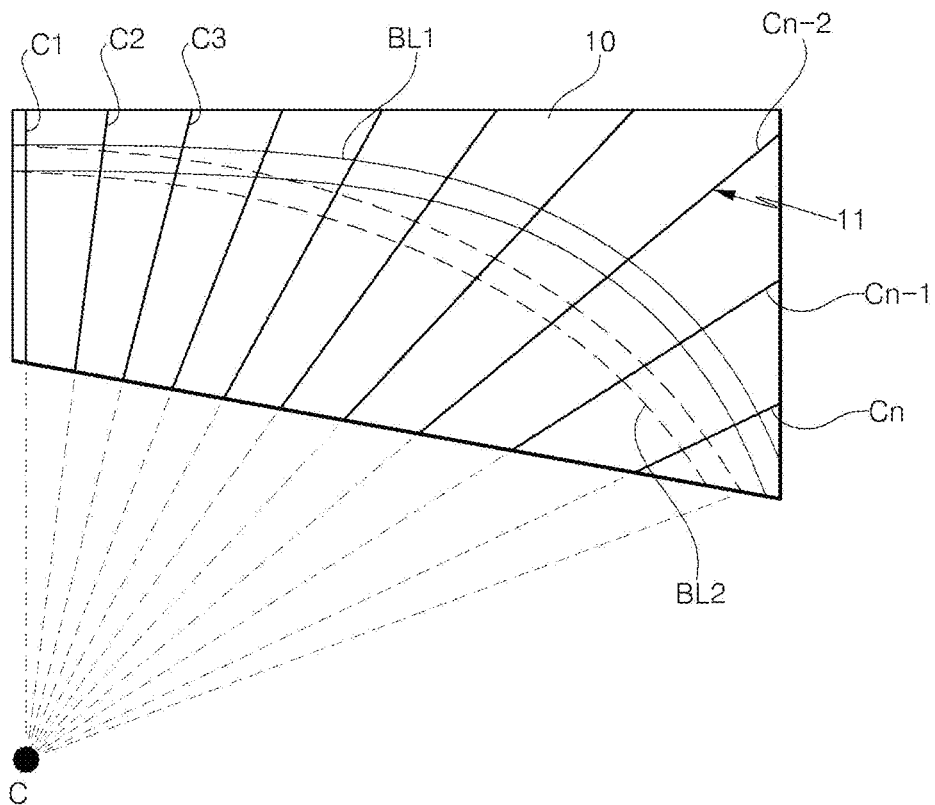
FIG. 6 is a partially enlarged plan view of a three-dimensional effect forming portion which can be applied to the lighting device of FIG. 1.

Also, according to some embodiments, when the respective pattern extension directions x1, x2, x3 x4 of the multiple patterns are designed to cross each other from at least one point without being not parallel to each other or to extend in a radial direction, unlike the first path to which the first line shaped beam B1 travels, the light passing along the multiple patterns may be expressed as a line shaped beam in a curved line form in which the beam is bent to a side in which a distance between the adjacent patterns reduces gradually (see FIG. 6).

Figure 5:
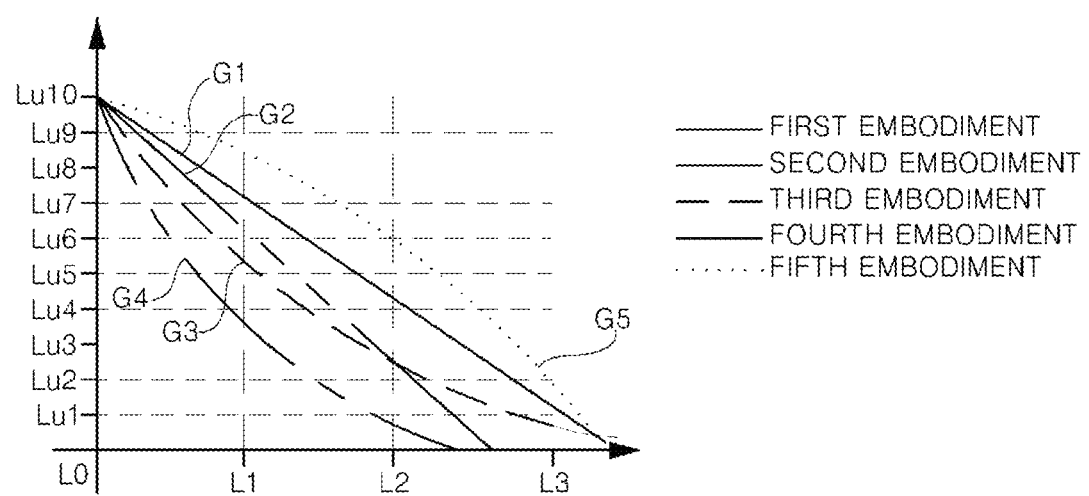
FIG. 5 is a graph showing a brightness change generated in a first path of the lighting device of FIG. 1.

FIG. 5 is a graph showing a brightness change generated in a first path of the lighting device of FIG. 1.

Referring to FIG. 5, with regard to the three-dimensional effect forming portion of the lighting device according to the present embodiment, the multiple patterns sequentially arranged from the light source are divided into the patterns of three sections, and reviewing brightness resulting from reflection and refraction of the patterns in the respective areas, each of the multiple patterns shows brightness in different ranges according to each distance L1, L2, L3 from the light source.

That is, when the multiple patterns of the three-dimensional forming portion are divided into first patterns of a first area L0-L1, second pattern of a second area L1-L2 and third patterns of a third area L2-L3 in terms of each distance from the light source, a second brightness of the second patterns is lower than a first brightness of the first patterns and is higher than a third brightness of the third patterns. Here, a second distance L2 between the light source and the specific second pattern farthest away from the light source among the second patterns is longer than a first distance L1 between the light source and the specific first pattern farthest away from the light source among the first patterns and is shorter than a third distance L3 between the light source and the specific third pattern farthest away from the light source among the third patterns.

More specifically, when a maximum brightness of the closest main pattern to the light source is level 10 Lu10, the specific first main pattern positioned at the first distance L1 from the light source may have a brightness of about level 8 Lu8, level 7 Lu7, level 6 Lu6, level 5 Lu5 or level 4 Lu4 according to different pattern designs of the first to fifth embodiment. The specific second main pattern positioned at the second distance L2 from the light source may have a brightness of about level 6 Lu6, level 4 Lu4, level 2 Lu2, or level 1 Lu1 according to pattern designs. Furthermore, the specific third main pattern positioned at the third distance L3 from the light source may have a brightness of about level 2 Lu2, level 1 Lu1, or level 0 (no brightness).

That is, the multiple patterns may refract and reflect the incident beams via the inclined surfaces of the multiple patterns and accordingly, the multiple patterns may implement the line shaped beams in which luminous intensity reduces as optical paths increase gradually in the first path and (see the multiple patterns of FIGS. 1 to 4). This is because specific parts of the multiple patterns of the first path function as sequentially arranged indirect light source in which a sense of distance or a perceptional depth increases and the intensity of light reduces as a distance from the light source increases gradually.

More specifically, referring to FIG. 5, for example, as shown in a brightness curve G1 of a first embodiment, according to a predetermined pattern design of the first embodiment, the first pattern, the second pattern and the third pattern serve as indirect light source having brightness values of about level 7, level 4 and level 1, respectively. According to this configuration, as a distance from the light source increases gradually, the multiple patterns may implement line shaped beams with a three-dimensional effect having a sense of increased distance from the multiple patterns, and luminous intensity which is substantially regularly reduced. In order to implement the three-dimensional effect beams, the multiple patterns may be designed in a fixed pitch.

Also, according to a pattern design of a second embodiment, as shown in a brightness curve G2 of the second embodiment, the first pattern, the second pattern and the third pattern serve as indirect light source having respective brightness values of about level 6, level 3, and level 0. According to such a configuration, the multiple patterns may implement three-dimensional effect beams having an increased perceptional depth in the thickness direction of the light guide portion from the multiple patterns and the intensity of light which is regularly rapidly reduced as a distance from the light source increases gradually. In order to implement the three-dimensional effect beams, the multiple patterns may be designed such that as a distance from the light source increases gradually, a pitch reduces or a pattern density per a unit length increases at a fixed rate.

Also, according to a pattern design of a third embodiment, as shown in a brightness curve G3 of the third embodiment, the first pattern, the second pattern and the third pattern serve as indirect light source having respective brightness values of about level 5, level 2, and level 1. According to such a configuration, the multiple patterns may implement three-dimensional effect beams in which a brightness reduction rate between the first area L0-L1 and the second area L1-l2 is larger than a brightness reduction rate between the second area L1-L2 and the third area L2-L3 as a distance from the light source increases gradually. In order to implement the three-dimensional effect beams, the multiple patterns may be designed in a fixed pitch which is narrower than the pitch of the first embodiment, or may be provided such that a pitch is gradually increased according to an increase in distance from the light source while being designed in a fixed pitch which is narrower than the pitch of the first embodiment.

Also, according to a pattern design of a fourth embodiment, as shown in a brightness curve G4 of the fourth embodiment, the first pattern, the second pattern and the third pattern serve as indirect light source having brightness values of about level 4, level 1, and level 0. According to such a configuration, the multiple patterns may implement three-dimensional effect beams in which brightness is further rapidly reduced relatively compared to the case of the third embodiment. In order to implement the three-dimensional effect beams, the multiple patterns may be designed in a fixed pitch narrower than the pitch of the third embodiment, or may be provided such that a pitch is gradually reduced according to an increase in distance from the light source while being designed in a fixed pitch narrower than the pitch of the third embodiment.

Also, according to a pattern design of a fifth embodiment, as shown in a brightness curve G3 of the fifth embodiment, the first pattern, the second pattern and the third pattern serve as indirect light source having respective brightness values of about level 8, level 6, and level 2. According to such a configuration, the multiple patterns may implement three-dimensional effect beams in which a brightness reduction rate between the first area L0-L1 and the second area L1-l2 is smaller than a brightness reduction rate between the second area L1-L2 and the third area L2-L3 as a distance from the light source increases gradually. In order to implement the three-dimensional effect beams, the multiple patterns may be designed in a fixed pitch which is wider than the pitch of the first embodiment, or may be provided such that a pitch is gradually reduced according to an increase in distance from the light source while being designed in a fixed pitch which is wider than the pitch of the first embodiment.

In the aforesaid first to five embodiments, it is assumed that the respective embodiments are identical to each other with respect to the pattern structures and reflection abilities of the inclined surfaces of the respective patterns for the respective embodiments. When there is a difference in the pattern structures and the reflection abilities among the patterns, by adjusting a pattern design in consideration of this fact, three-dimensional effect beams having brightness which is naturally reduced may be obtained by the indirect light source effects of the multiple patterns sequentially arranged.

According to the present embodiment, thanks to the effect of the reduction in brightness and the effect of the indirect light source of the multiple patterns resulting from a difference in a distance from the light source, namely, a difference in optical paths, a line shaped beam, a three-dimensional effect beam or a line shaped beam with a three-dimensional effect can be implemented.

FIG. 6 is a partially enlarged plan view of a three-dimensional effect forming portion which can be applied to the lighting device of FIG. 1.

Referring to FIG. 6, a lighting device according to the present embodiment is configured to include the light guide portion 10, the reflective portion (see reference numeral 12 of FIG. 1), the three-dimensional forming portion provided on one surface of the light guide portion 10 and the light source portion (see reference numeral 30 of FIG. 1).

The three-dimensional effect forming portion is configured to include the multiple patterns provided in a structure in which pattern arrangement directions cross each other from the first surface of the light guide portion 10. The multiple patterns include a first pattern C1, a second pattern C2, a third main C3, an n-second pattern Cn−2, an n-first pattern, and an nth pattern Cn in order of the location nearest to the light source. Here, n is a natural number of 6 or more.

In the present embodiment, the multiple patterns are arranged to extend in directions which are not parallel to each other. That is, with regard to the respective pattern extension directions of the multiple patterns, virtual extension lines thereof may meet at one point of intersection C.

According to the present embodiment, when light of the light source passes along the three-dimensional effect forming portion, the multiple patterns may implement a line shaped beam BL1 of the first path (optical path) which is bent with a curvature to a side in which the pattern extension directions cross each other, namely, a side in the which an intersecting point C is present. This is because the light travels along a direction meeting at right angles to each of the pattern extension direction of the multiple main patterns according to the Fermat's principle that 'a ray of light traveling in a medium travels along a movement path that can be traversed in the least time.'

Also, when an observing point or a fixed standard point of an observer (a person, a camera or the like) who observes the line shaped beam BL1 of the first path is moved from a first point Pa to a second point Pb, the lighting device of the present embodiment expresses a line shaped beam BL2 traveling along another optical path instead of the line shaped beam BL1 traveling along the first path. This is because the position of the first path meeting at right angles to the pattern extension directions of the multiple patterns is moved to a direction opposite to the movement direction of the standard point according to a change of the standard point.

As described above, the lighting device of the present embodiment may implement the line shape beams having various optical images (a straight line, a curved line or a combination thereof) expressed by traveling along the pattern extension directions of the multiple patterns according to the position of the standard point or the observing point through a pattern design of the three-dimensional effect forming portion.

Figure 7:
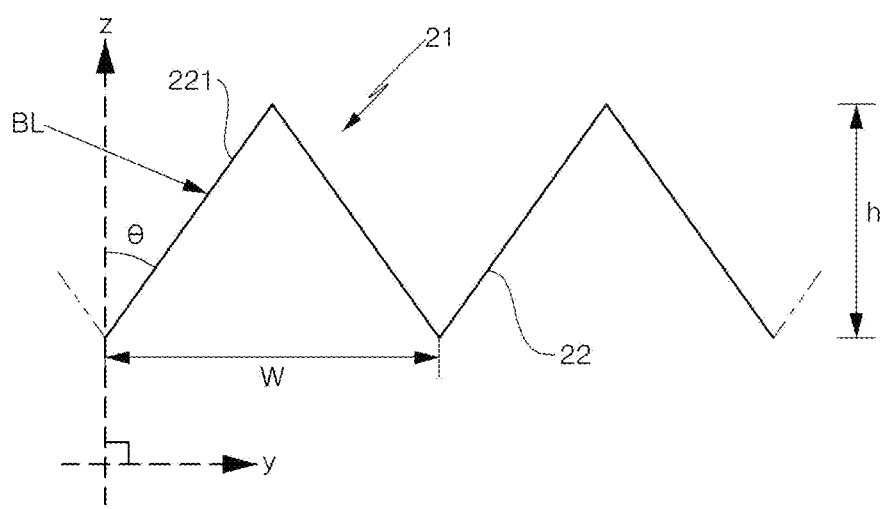
FIG. 7 is a view showing patterns of the three-dimensional effect forming portion of the lighting device of FIG. 1.

FIG. 7 is a view showing patterns of the three-dimensional effect forming portion of the lighting device of FIG. 1.

Referring to FIG. 7, the respective patterns 22 of the three-dimensional forming portion 21 according to the present embodiment may be provided so as to have a pattern structure in a triangular cross section form. When each of the patterns 22 has the triangular cross section structure, each of the inclined surfaces 221 has a fixed inclination angle in the extension direction (y-direction) of the first surface or the pattern arrangement surface (see reference numeral 101 of FIG. 8). In other words, each of the inclined surfaces 221 is provided to be bent to the extent of a fixed inclination angle θ with respect to the direction (z-direction) meeting at right angles to the pattern arrangement surface.

The inclination angle θ is larger than about 5° and smaller than about 85°. The inclination angle θ may be further limited in consideration of a refractive index of the light guide portion, but the inclination angle may be basically designed in the range of about 5° to 85° in consideration of reflection and refraction beyond a fixed level from the inclined surfaces 221.

In one embodiment, when the refractive index of the light guide portion is about 1.30 to 1.80, an inclination angle of the inclined surface 221 on one side of the respective patterns 22 may be larger than 33.7° and smaller than 50.3°, or may be larger than 49.7° and smaller than 56.3° according to a standard direction (z-direction or y-direction).

Also, in another embodiment, the light guide portion or the multiple patterns may be made of a material having a high refractive index. For example, in the case of manufacturing high intensity LEDs, when a ray of light having a specific incidence angle penetrates a capsule material by passing along a semiconductor die, total internal reflection is performed due to a difference in an n value (a refractive index) between the semiconductor die (n=2.50~3.50) and a general polymeric capsule element (n=1.40~1.60), and accordingly, light extraction efficiency of the device is reduced. Thus, in order to properly solve this problem, a high refractive index polymer (n=1.80~2.50) is used. In the present embodiment, the light guide portion or the multiple patterns may be provided by utilizing the high refractive index polymer (n=1.80~2.50) used in manufacturing high intensity LEDs. In this case, the inclination angle of the inclined surface 221 of each pattern 22 may be larger than 23.6° and smaller than about 56.3°, or may be larger than 33.7° and smaller than 66.4° according to each refractive index of the multiple patterns.

Also, according to some embodiment, the multiple patterns may be coated with at least one functional layer having a high refractive index for refractive index adjustment.

An inclination angle according to the refractive index may be represented by following Equation 4 according to the Snell's law based on a critical angle in which a refraction angle is 90°.

$$\frac{\sin\theta_1}{\sin\theta_2} = \frac{n2}{n1} \quad \text{Equation 4}$$

In Equation 4, sin θ1 is a refraction angle or an incidence angle of light shown in a first medium of a first refractive index n, and sin θ2 is an incidence angle or a refraction angle of light shown in a second medium of a second refractive index n2.

As previously described, the inclined surface of each of the multiple main patterns in the present embodiment may be provided to have an inclination angle θ ranging from about 5° to about 85° as an inclination angle which enables an incident beam to be reflected or refracted appropriately.

Also, according to the patterns 22 of the present embodiment, in addition to the inclination angle of the inclined surface, a rate of a width w to a height h may be limited to a fixed rate for convenience of a production process. The width w of each of the patterns may correspond to a pitch which is a distance between the patterns adjacent to a width of a bottom surface of each pattern.

With regard to limiting the rate of the width w to the height h of each of the patterns 22, when the patterns are designed so as to emphasize a cubic effect of the line shaped beam, the width w of each of the patterns 22 may be provided to be equal to or smaller than the height h. Also, when the patterns are designed so that the line shaped beam with the three-dimensional effect can express a relatively long image, the width w of each of the patterns 22 may be provided to be larger than the height h.

As another example, when each of the multiple pattern 22 has a lenticular form, a rate (h/w) of a width (or a diameter) to a height of each of the multiple patterns 22 may be about ½ or less. At this time, an inclination angle θ of the inclined surface of each of the patterns 22 may be about 45° or more.

As such, in the present embodiment, by using the width w and the height h of each pattern 22 as factors for property adjustment, optical images of the line shaped beam, the three-dimensional effect beam or the like intended to be expressed by the lighting device may be efficiently controlled.

In the present embodiment, the width w between two adjacent patterns in the three-dimensional effect forming portion 21 may be 10 to 500 μm This width w may refer to an average distance among the multiple main patterns of the first path, and may be designed to be slightly wider or narrower according to each pattern design or each desired shape of optical images.

Figure 8:
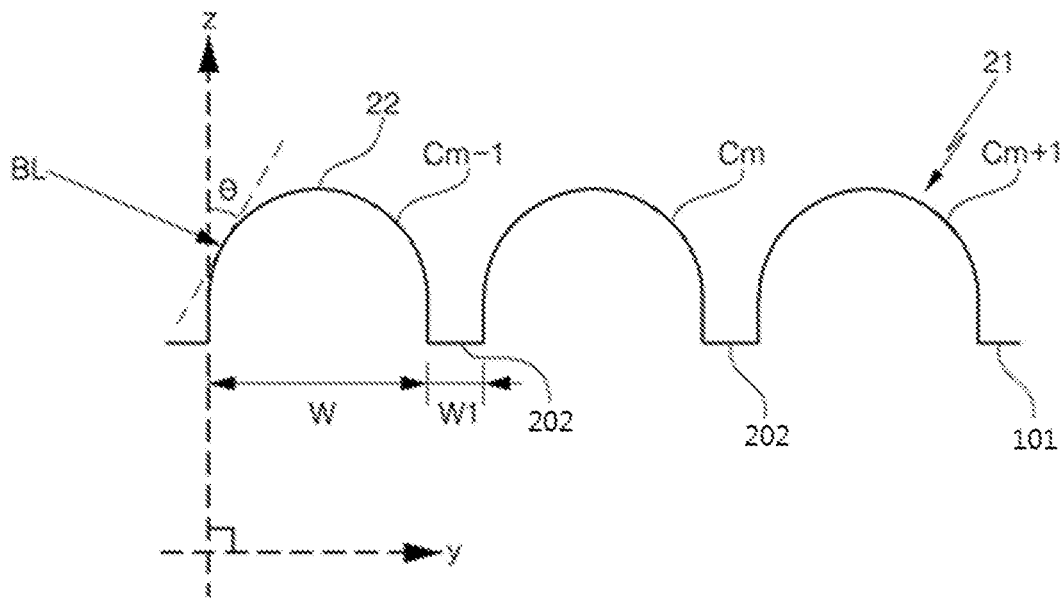
FIG. 8 is a view showing another embodiment for the patterns of the three-dimensional effect forming portion shown in FIG. 7.

FIG. 8 is a view showing another embodiment for the patterns of the three-dimensional effect forming portion shown in FIG. 7.

Referring to FIG. 8, when designing the three-dimensional effect forming portion 21 of the lighting device according to the present embodiment, the multiple patterns 22 may be provided so as to have a pattern structure having a semi-circular cross section or a semielliptical cross section. Each of the patterns 22 has a inclined surface inclined at a predetermined angle in a thickness direction (z-direction) of the light guide portion or a direction (y-direction) to which the first surface or a pattern arrangement surface 101 extends. Each of the patterns 22 may have a symmetrical form based on a center line (not drawn) in the z-direction, but is not limited thereto.

In the present embodiment, the inclined surface of each of the patterns 22 may have a structure in which an inclination angle is changed according to each position of the inclined surface due to the semicircular structure of the patterns. That is, since the inclined surface of each of the patterns 22 is a surface in contact with an arbitrary point on a circular arc, a tangent line in contact with an arbitrary point on each of the patterns 22 or a surface in contact with the arbitrary point may be placed at a fixed inclination angle θ in the direction (the z-direction) meeting at right angles to the pattern arrangement surface 101. The inclination angle θ may be larger than 0° and smaller than 90° according to each position of a circular cross section which the beam BL hits.

Also, the three-dimensional effect forming portion 21 of the present embodiment may include a spaced portion 202 provided between two adjacent patterns. That is, when the multiple patterns include a first pattern Cm−1, a second pattern Cm and a third pattern Cm+1 (wherein, m is a natural number of 2 or more), the three-dimensional effect forming portion 21 may include pattern separation portions 12 provided between the first pattern Cm−1 and the second pattern Cm, and between the second pattern Cm and the third pattern Cm+1.

Each of the pattern separation portions 202 may be a part of the first surface 101 positioned between two adjacent patterns as a part of the first surface 101 of the light guide portion in which concave patterns are not formed. Also, the pattern separation portion 202 may be provided for convenience of the manufacturing process as a gap between two adjacent patterns. The pattern separation portion 202 may be omitted according to a manufacturing process or a pattern design of specific implementation.

A width w1 of the pattern separation portion 202 is smaller than a width w of the pattern 22. The width w1 of the pattern separation portion 202 is may be about ⅕ or less or several μm or less of the width w of the pattern 22.

Figure 9:
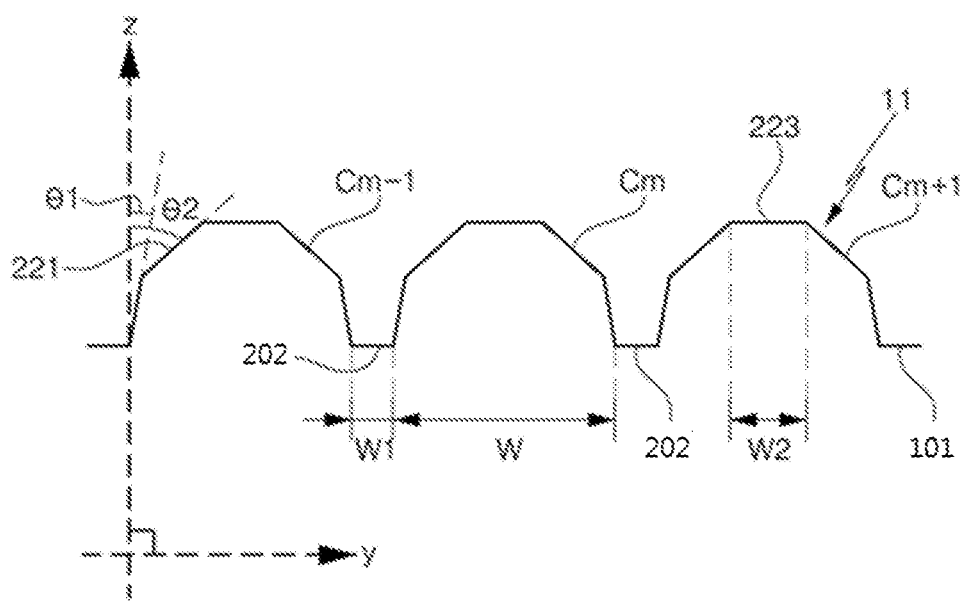
FIG. 9 is a view showing still another embodiment for the patterns of the three-dimensional effect forming portion shown in FIG. 7.

FIG. 9 is a view showing still another embodiment for the patterns of the three-dimensional effect forming portion shown in FIG. 7.

Referring to FIG. 9, when designing the three-dimensional forming portion 21 of the lighting device according to the present embodiment, the multiple patterns 22 may be provided to have a pattern structure having a polygonal section form. Each of the inclined surfaces 221 of the patterns 22 may have a broken-line graph-like shape.

In the present embodiment, each of the inclined surfaces 221 of the patterns 22 is provided so as to have multiple inclination angles θ1, θ2 according to the number of segments of the broken-line graph in the direction (z-direction) crossing at right angles to the first surface or the pattern arrangement surface 101. The second inclination angle θ2 may be larger than the first inclination angle θ1. The first and second inclination angles θ1, θ2 may be designed within the range which is larger than about 5° and smaller than about 85° according to a position where the beam BL hits.

Also, the three-dimensional effect forming portion 21 may be configured to further include the pattern separation portion 202 provided between two adjacent patterns. A width w1 of the pattern separation portion 202 is smaller than the width w of each of patterns in order to naturally implement a line shaped beam or a three-dimensional effect beam via the three-dimensional forming portion 21. When a line shaped beam or a three-dimensional effect beam having a desired shape (a shape without an interruption or the like) is implemented through a design of the multiple patterns, the width w1 of the pattern separation portion 202 may be designed to be narrow maximally or may be designed so that the pattern separation portion 202 can be omitted. When the pattern separation portion 202 is provided, the pattern separation portion 202 is designed to have the width w1 of several μm or less.

Also, the three-dimensional effect forming portion 21 may have an interrupted surface 223 parallel to the pattern arrangement surface 113 of the respective patterns. The interrupted surface 223 is a part which does not function to enable light to be substantially emitted to the outside through the reflection or refraction of incident beam. Thus, since a line shaped beam implemented by the multiple patterns may have an interrupted part corresponding to the interrupted surface 223, a width w2 of the interrupted surface 223 may be appropriately designed in a range of several μm or less in order to implement a line shaped beam having a desired shape.

Figure 10:
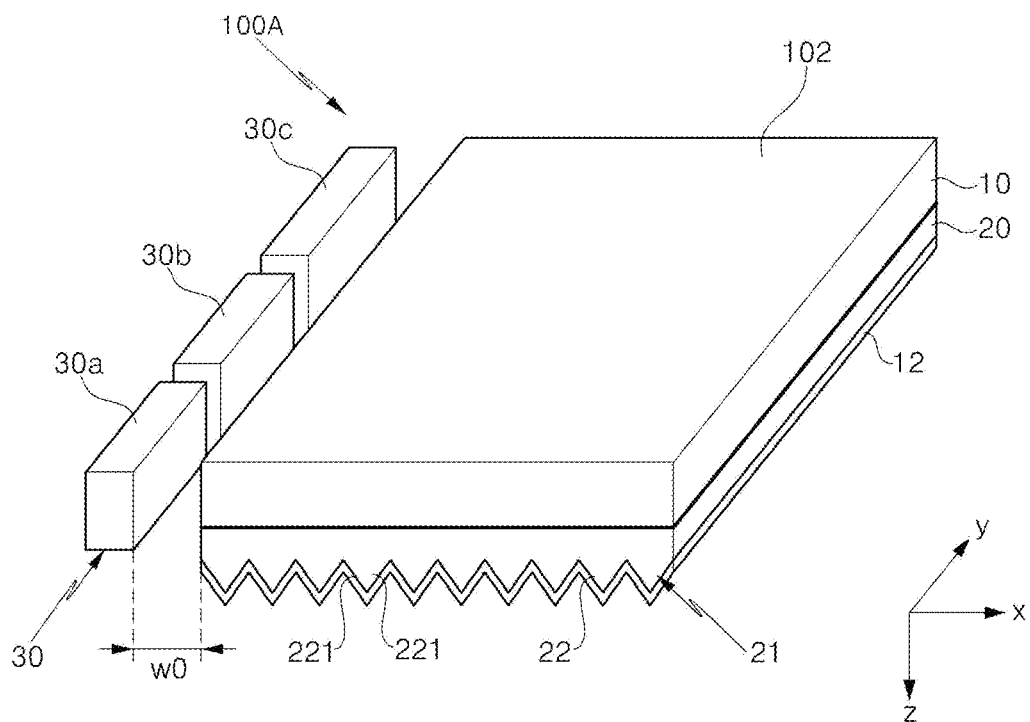
FIG. 10 is a perspective view of a lighting device according to another embodiment of the present disclosure.
Figure 11:
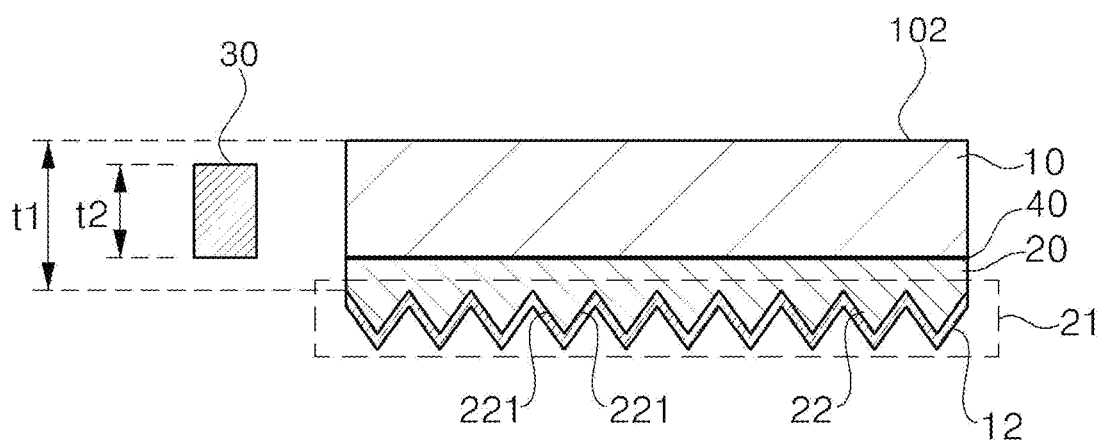
FIG. 11 is a cross-sectional view of the lighting device of FIG. 10.

FIG. 10 is a perspective view of a lighting device according to another embodiment of the present disclosure. FIG. 11 is a cross-sectional view of the lighting device of FIG. 10.

Referring to FIGS. 10 and 11, a lighting device 100A according to the present embodiment includes: the light guide portion 10; the three-dimensional forming portion 21 provided on the first surface of the light guide portion 10; the reflective portion 12; and the light source portion 30.

The lighting device 100A of the present embodiment may be substantially identical to the lighting device 100 explained with reference to FIGS. 1 to 3 except for the fact that the three-dimensional forming portion 21 is provided by bonding the separate pattern layer 20 rather than being provided in a form in which a part of one surface of the light guide portion is removed, and the reflective portion 12 is provided on the multiple patterns 22 formed on one surface of the pattern layer 20.

The pattern layer 20 is made of a material identical or similar to that of the light guide portion 10. The pattern layer 20 may be provided with a transparent member having the multiple patterns. The multiple patterns 22 constitute the three-dimensional forming portion 21.

A resin material such as a thermosetting polymer, a photocurable polymer and the like may be used as the material of the pattern layer 20. The material of the pattern layer 20 may be polycarbonate, polymethylmethacrylate, polystyrene, polyethylene terephthalate, and the like, but is not limited thereto.

According to a manufacturing process, the pattern layer 20 may be directly bonded to the first surface of the light guide portion 10 without using a separate adhesive material. In this case, the pattern layer 20 has a heat reaction type adhesive property such as heat sealable property and heat welding and the like.

Meanwhile, when the pattern layer 20 is bonded to one surface of the light guide portion 10, a fixed adhesive material may be used. In this case, as illustrated in FIG. 11, an adhesive layer is disposed between the light guide portion 10 and the pattern layer 20. An optical transparent adhesive, an adhesive and the like may be used as the adhesive material of the adhesive layer 40. The adhesive material such as epoxy resin and the like may be used. The adhesive layer 40 may be implemented using PEA (Phenoxyethyl Acrylate) which is a high refractive material for adjustment of a refractive index. Also, the adhesive layer 40 may be made of a fluorinate polymer, a fluorinate monomer and the like.

The reflective portion 12 is provided on the multiple patterns 22. In the present embodiment, the reflective portion is configured to include a coating layer on the multiple patterns 22. The reflective portion 12 may be a total reflection coating layer. Ag, Al, a white sheet and the like may be used as a material of the reflective portion 12.

The light source portion 30 supplies an incident beam to a side of the light guide portion 10. A height of the light source portion 30 is identical to or smaller than the thickness t1 of the light guide portion 10.

The light source portion 30 may be identical to the light source portion of the lighting device of FIG. 1. However, the light source portion 30 of the present embodiment is configured to multiple light source 30a, 30b, 30c which are separated from each other by a predetermined distance. In this case, the light source portion 30 may irradiate light in directions parallel to each other or different directions in different areas of the light guide portion 10 or may irradiate light in opposite directions facing each other. That is, when the patterns of multiple groups arranged in different arrangement directions in different areas of the light guide portion 10, and the multiple light sources, the lighting device 100A of the present embodiment may implement multiple line shaped beams of different optical paths (see FIG. 17).

Figure 12:
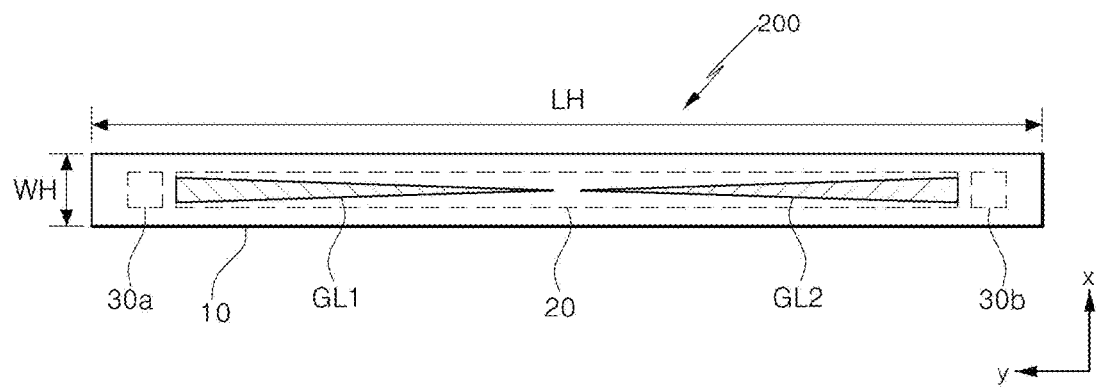
FIG. 12 is a plan view of a lighting device according to still another embodiment of the present disclosure.

FIG. 12 is a plan view of a lighting device according to still another embodiment of the present disclosure.

Referring to FIG. 12, a lighting device 200 according to the present embodiment is configured to include the light guide portion 10, the reflective portion (see reference numeral 12 of FIG. 1), the pattern layer 20, and the light source portion. The light guide portion 10 and the pattern layer 20 form a single optical member and the reflective portion is disposed on one surface of the optical member.

The lighting device 200 is formed in a rod-like shape having a predetermined length LH and width WH. The length LH and the width WH may be formed similar or identical to a length or a diameter of a 20 W fluorescent lamp or a 40 W fluorescent lamp.

The pattern layer 20 includes the multiple patterns that extend from one surface in the x-direction and are sequentially arranged in the y-direction. The multiple patterns serve as a three-dimensional effect forming portion. The light guide portion 10 may be provided to bury or surround the pattern layer 20. In the present embodiment, the light guide portion 10 and the pattern layer 20 may be identical to the light guide portion and the pattern layer of the embodiment previously described with reference to FIGS. 10 and 11.

The light source portion is configured to include a first light source 30a and a second light source 30b arranged at both ends in a length direction of the light guide portion 10. The first light source 30a and the second light source 30b may be provided with one among various existing light sources such as an incandescent lamp, a halogen lamp, a discharge lamp and the like or may be provided using indirect light source such as a guide member for guiding or reflecting natural light generated from the sun. Also, the first light source 30a and the second light source 30b may be provided to include LED (Light Emitting Diode) elements according to some embodiments. In this case, the light source portion may include a printed circuit board in which the first light source 30a, the second light source 30b and a drive circuit supplying power to these light sources are installed.

The first light source 30a and the second light source 30b may include LED (Light Emitting Diode) elements according to some embodiments. In this case, the light source portion may include the first light source 30a, the second light source 30b, and a printed circuit board in which a drive circuit for supplying power to these light sources is mounted.

In the present embodiment, the first light source 30a and the second light source 30b irradiate light from both ends in the length direction of the light guide portion 10 to a central part. According to this configuration, through a pattern design of the three-dimensional effect forming portion, the lighting device 200 may express an incident beam from each of the two light sources 30a, 30b as respective line shaped beams GL1, GL2 which start from the both ends in the length direction of the light guide portion to extend in a direction facing the central part and disappear from the central part.

Figure 23:
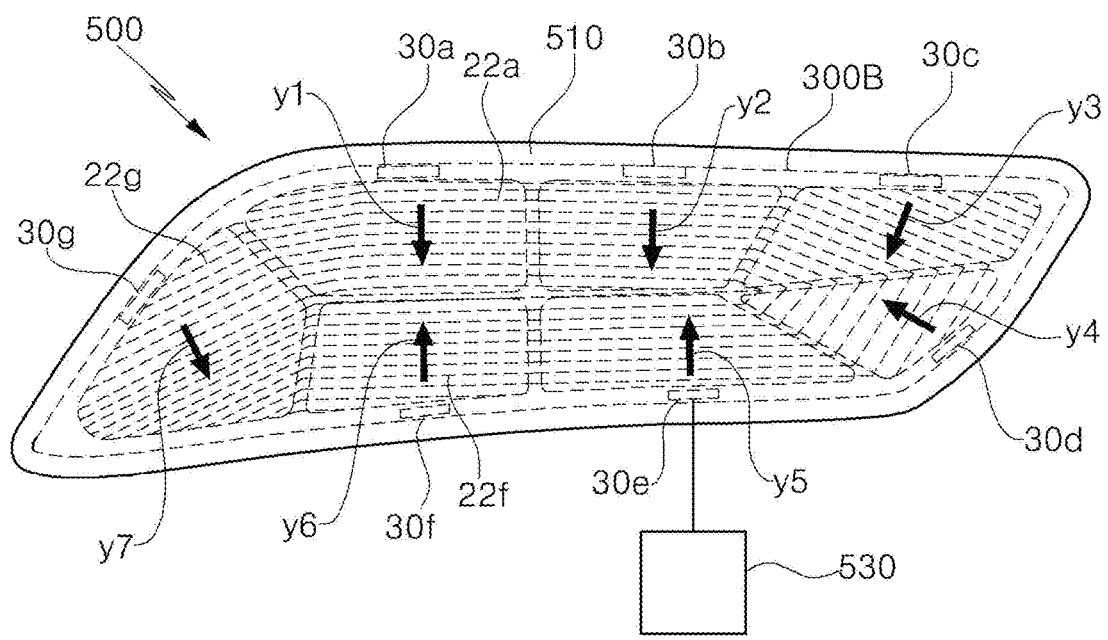
FIG. 23 is a plan view of a lighting device according to still another embodiment of the present disclosure.

Also, according to the present embodiment, in different areas of the light guide portion, when a beam in roughly a hemispherical shape is irradiated on the basis of the light source (or a light emitting surface of the light source), by controlling the light source through a pattern design, line shaped beams extending in opposite directions, or line shaped beams extending in directions having an angle of more than 90° and less than 180° in the opposite directions, namely, directions crossing each other, may be implemented (see y3 and y4 of FIG. 23).

Also, according to some embodiments, by controlling the incident beam of the light source through a pattern design, line shaped beams extending in the same direction or line shaped beams extending in directions crossing each other in the same direction may be implemented.

Figure 22:
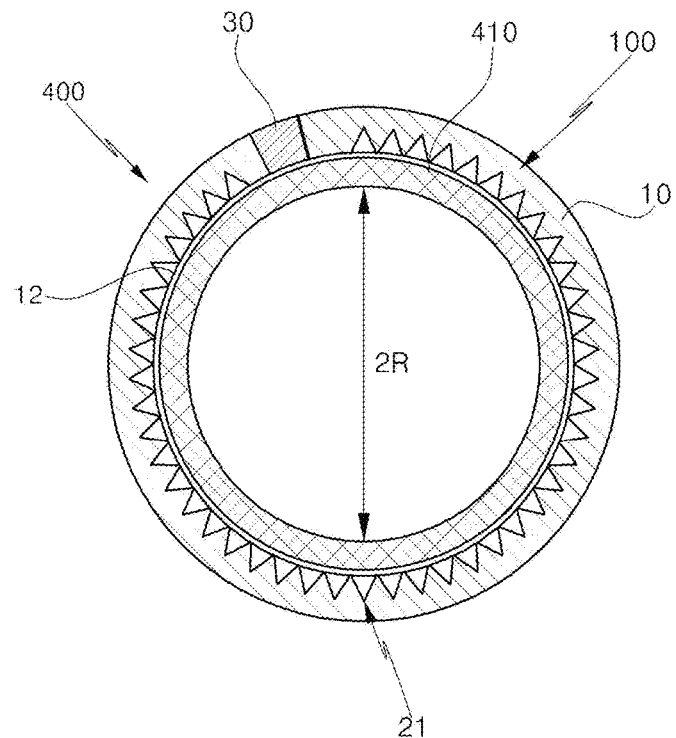
FIG. 22 is a cross-sectional view of a lighting device according to still another embodiment of the present disclosure.

Meanwhile, the lighting device 200 according to the present embodiment may further include a support member or a housing for supporting the light guide portion 10 or the light sources 30a, 30b (see reference numeral 410 of FIG. 22 and reference numeral 510 of FIG. 23).

Figure 13:
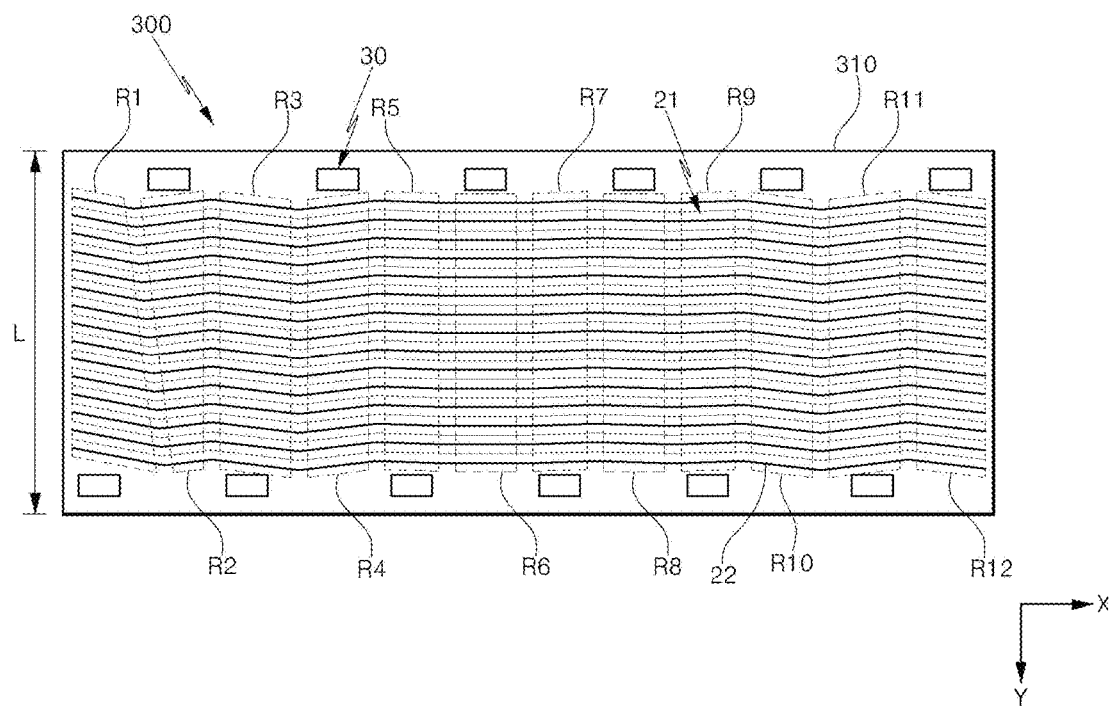
FIG. 13 is a plan view of a lighting device according to still another embodiment of the present disclosure.

FIG. 13 is a plan view of a lighting device according to still another embodiment of the present disclosure.

Referring to FIG. 13, a lighting device 300 according to the present embodiment is configured to include: the light guide portion, the reflective portion (see reference numeral 12 of FIGS. 10 and 11), the three-dimensional effect forming portion 21, the light source portion 30 and the support member 310.

The light guide portion may be provided at one surface of the support member 310 in a fixed thickness and may be provided on the support member 310 to bury the three-dimensional forming portion 21. Except for the fact that the light guide portion includes the three-dimensional forming portion 21 provided in each of the different areas R1, R2, R3, R4, R5, R6, R7, R8, R9, R10, R11 and R12, and twelve light sources for irradiating each beam to the different areas, the light guide portion may be substantially identical to the light guide portion 10a of the lighting device of FIG. 1 or the light guide portion 10 of the lighting device of each of FIGS. 10 and 11.

The three-dimensional effect forming portion 21 may be provided inside the light guide portion or on the first surface or the second surface of the light guide portion. Also, the three-dimensional effect forming portion 21 may be provided so that the multiple patterns of the first area R1 arranged at one side of the light guide portion 10 can integrally continuously extend to the multiple patterns of the twelfth area R12 arranged at the other side of the light guide portion 10 via the multiple patterns of the second to eleventh areas R2 to R11 arranged at the center of the light guide portion. At this time, the respective patterns of the three-dimensional effect forming portion 21 may have a bent portion at a boundary part between two adjacent areas.

The three-dimensional forming portion 21 of the present embodiment may be substantially identical to any one of the three-dimensional forming portions of the lighting devices previously explained with reference to FIGS. 1 to 12, except for the fact that the three dimensional forming portion includes the multiple patterns sequentially arranged in the different areas R1 to R12, respectively of the light guide portion 10.

The light source portion 30 includes twelve light sources for irradiating light to the respective patterns of the multiple groups of the three-dimensional forming portion 21 provided in each of different areas R1, R2, R3, R4, R5, R6, R7, R8, R9, R10, R11 and R12 of the light guide portion 10. In the present embodiment, the respective light sources are LED light sources. Each of the light sources is an LED package including two LED elements and is provided so as to emit two beams via the respective LED elements.

Also, when the light source portion 30 includes a first light source and a second light source, the first light source and the second light source may be arranged to irradiate the light in directions parallel to each other in the same direction or in directions crossing each other in the same direction. Also, according to some embodiments, the first light source and the second light source may be arranged to irradiate the light in a single straight line direction or in directions parallel to each other in opposite directions, or to irradiate the light in different directions having an angle of more than 90° and less than 180° between the first light source and the second light source.

The support member 310 supports the light guide portion or the light source portion 30. The support member 310 may be a part of a housing or a case of the lighting device 300, or may have the structure of an instrument for attaching the lighting device to a specific position. Also, the support member 310 may be a wall inside and outside a building or one surface of a product or equipment. The support member 310 may be implemented using devices or products without being specially limited thereto if the devices or products enable an optical member to be disposed at a place where light of the light source portion 30 is irradiated. For example, the support member 310 may be implemented using a cap, clothing, shoes, a bag, an accessory, indoor and outdoor interior components and the like.

Figure 14:
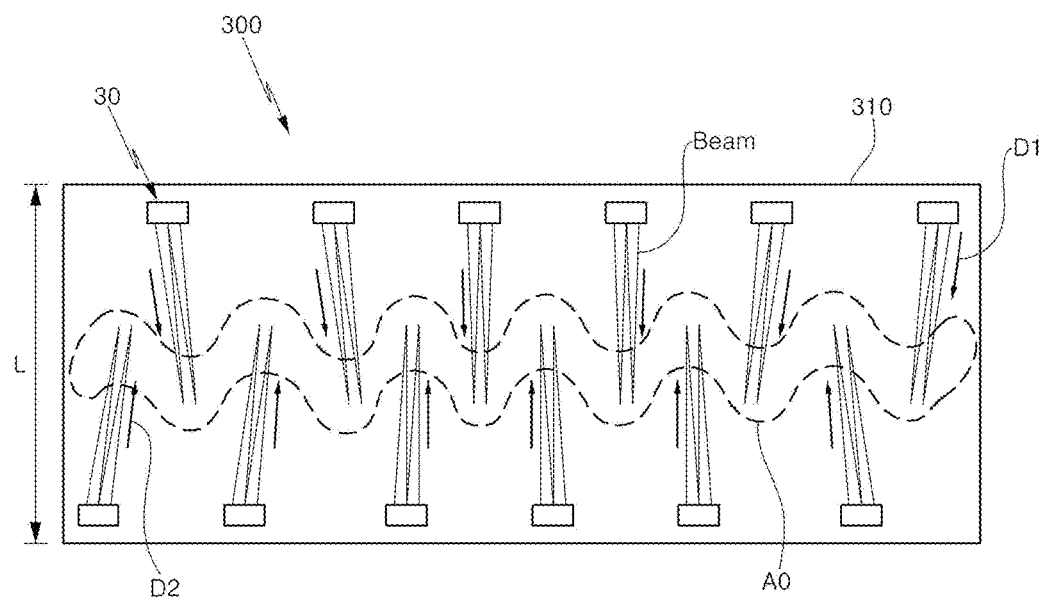
FIG. 14 is a plan view showing an operational state of the lighting device of FIG. 13.
Figure 15:
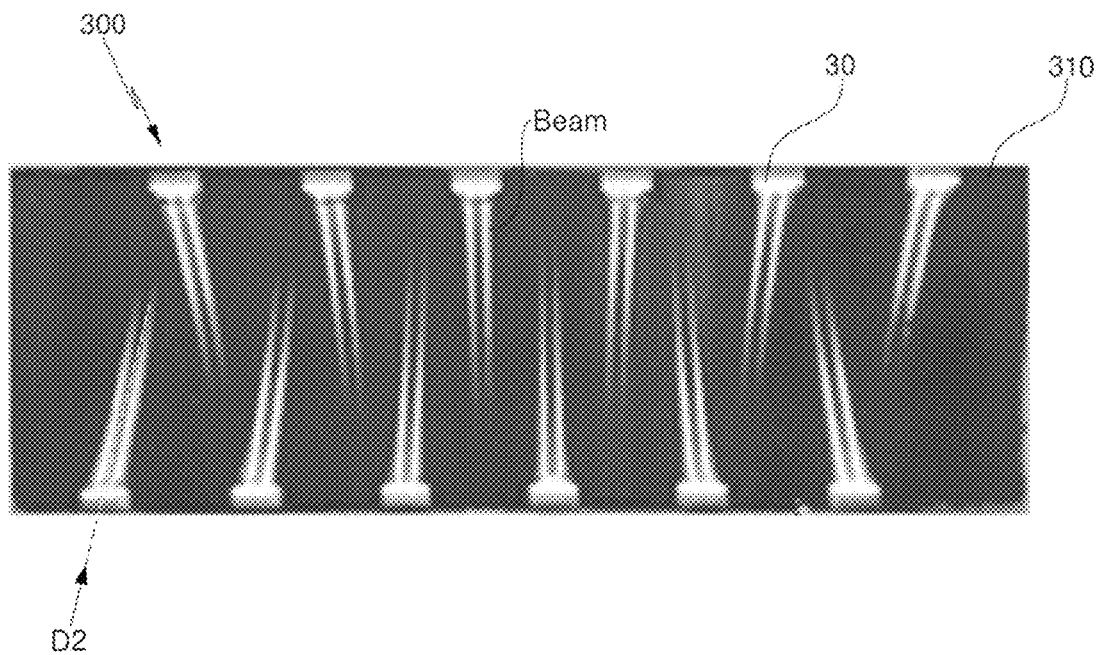
FIG. 15 is a view showing an operational state of the lighting device of FIG. 13.

FIG. 14 is a plan view showing an operation state of the lighting device of FIG. 13. FIG. 15 is a view showing an operation state of the lighting device of FIG. 13.

Referring to FIGS. 14 and 15, when the lighting device of the present embodiment is operated, an incident beam of each of the light sources is irradiated from edges of both sides in a width direction of the light guide portion or the support member 310 to a central part A0, and is converted into a line shaped beam traveling to the first path D1, D2 and the like having a predetermined optical width via the patterns of the respective areas of the light guide portion. Here, the optical width of the line shape beam may be less than a width of the light emitting surface of the light sources irradiating the light to the patterns, and a length of the line shaped beam may be larger than the optical width.

According to the present embodiment, by using the multiple patterns of the three-dimensional effect forming portion provided on the support member 310 having a length L of the width direction of about 250 mm, a beam of a white LED lamp of about 10 W may be implemented as a three-dimensional effect beam or a line shaped beam with a three-dimensional effect in which the intensity of light of the light source becomes largely weak or disappears at roughly the central part A0 in a width direction of the support member 310.

That is, according to the present embodiment, the incident beam passing along the light guide portion or the three-dimensional effect forming portion may be expressed by the sequentially arranged patterns as a three-dimensional effect beam in which the intensity of light reduces rapidly and disappears at a very relatively short distance (for example, about 100 to 200 mm). Here, the very short distance corresponds to a short distance beyond '1/(hundreds to thousands of' times compared to a distance (for example, several meters to tens of meters) in which light passing along a transparent substrate is naturally reduced and disappears when the light is irradiated to the transparent substrate (corresponding to the base substrate) of a comparative example in which main patterns are not provided.

Meanwhile, in the present embodiment, it is illustrated that each of the light sources of the lighting device irradiates two beams by using the LED package having two LED elements as the light sources, but the present disclosure is not limited to such a configuration. Each of the light sources may irradiate one beam by using the LED package having one LED element as the light sources.

Figure 16:
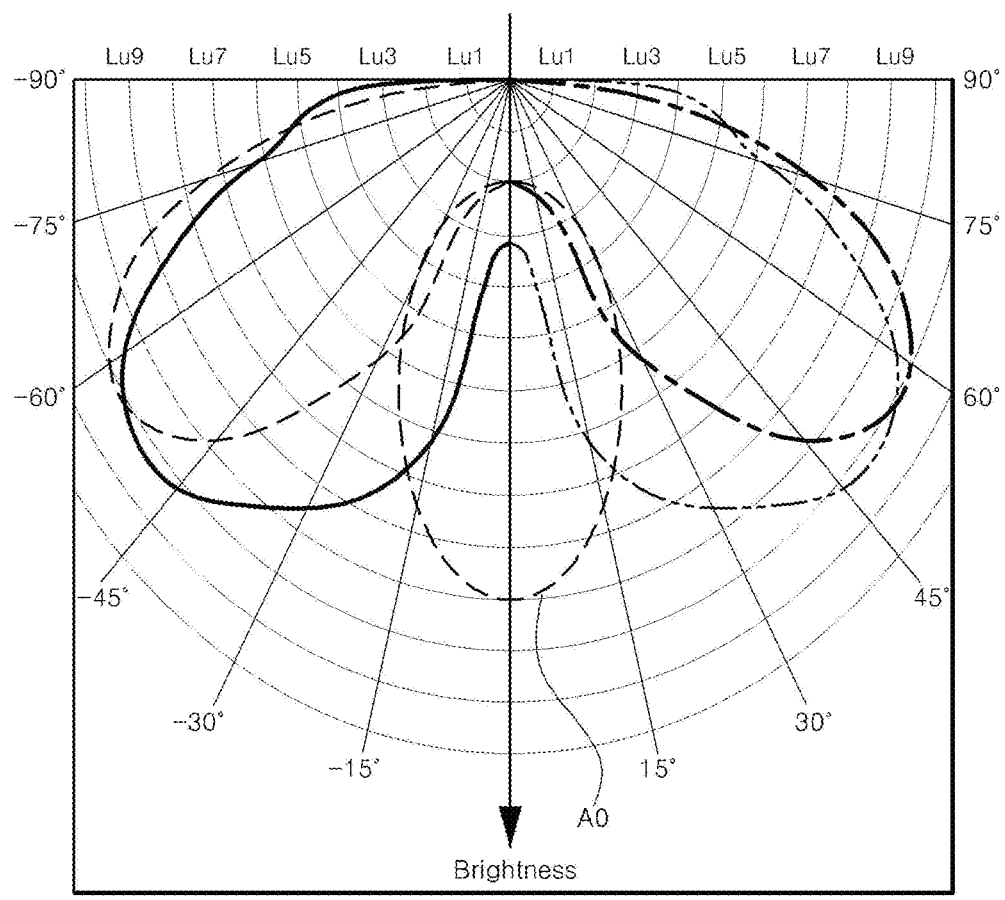
FIG. 16 is a brightness graph of the lighting device of FIG. 15.

FIG. 16 is a brightness graph of the lighting device of FIG. 15.

The graph of the present embodiment results from measuring brightness by a brightness measuring instrument in a front central part of the lighting device of FIG. 15.

Referring to FIG. 16, when the intensity of light of the light source is Lu12 maximally, it can be seen that a first brightness (about Lu5) in the central area A0 of the front of the light emitting surface of the light source of the lighting device (see reference numeral 300 of FIG. 13) is relatively largely small compared to a second brightness (about Lu7 to about Lu12) in the other areas of the front of the light emitting surface. In particular, in consideration of the fact that the first brightness in the central area A0 is affected by the second brightness in the other areas of the periphery, the intensity of light in the central area A0 of the light emitting surface of the lighting device can be really predicted to be near to 0.

The reason why the measurement results of the graph are shown is because the incident beams passing along the multiple patterns of the three-dimensional effect forming portion are sequentially refracted and reflected from the inclined surfaces of the patterns and rarely have the intensity of light in the central area A0. When this principle is used, optical images (line shaped beams, the three-dimensional effect beam and the like) having desired shapes may be implemented through a pattern design.

Figure 17:
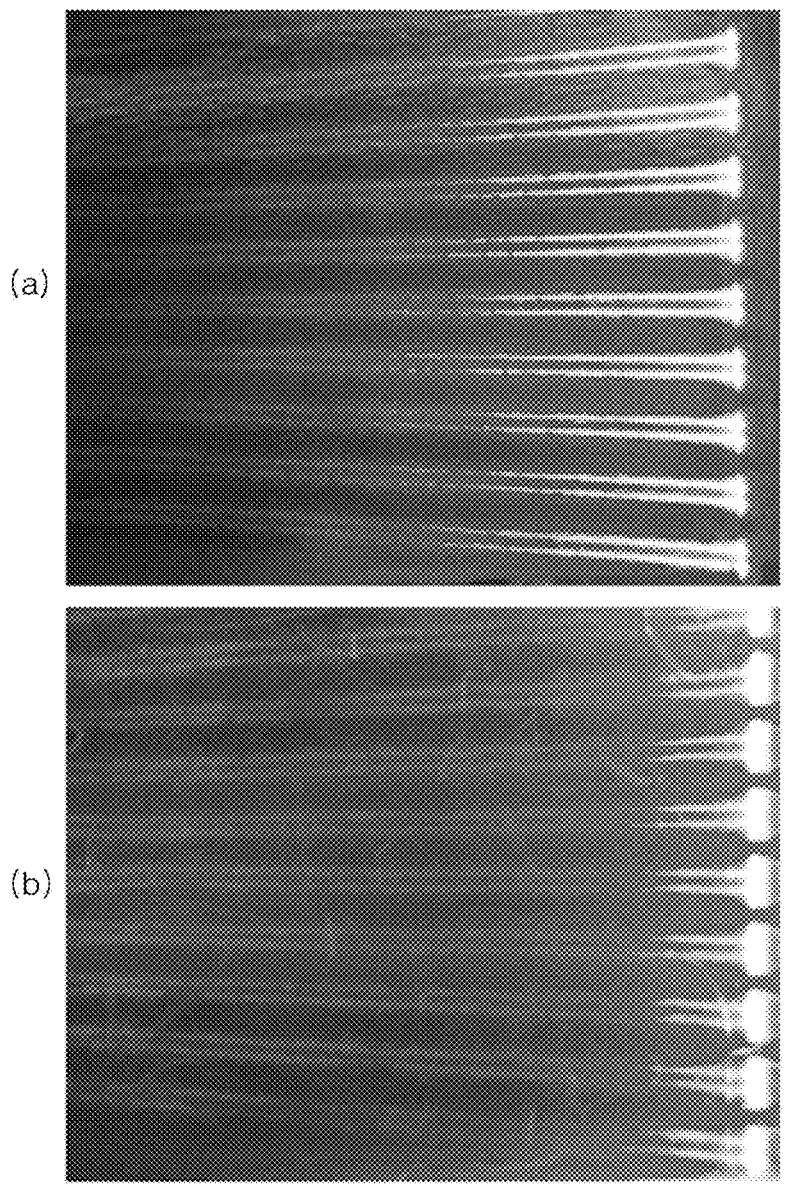
FIG. 17 is an operation state view of a lighting device according to still another embodiment of the present disclosure.

FIG. 17 is an operational state view of a lighting device according to still another embodiment of the present disclosure.

Referring to FIG. 17, the lighting device according to the present embodiment is configured to include a reflective portion (see reference numeral 12 of FIG. 21) on the pattern arrangement surface in which the multiple patterns of the three-dimensional effect forming portion are arranged.

The reflective portion in the present embodiment is a total reflection coating layer coated on the multiple patterns of the three-dimensional effect forming portion. A material of the reflective portion may be Ag, Al, a white sheet and the like.

When the aforesaid reflection portion is used, it is advantageous in that constitutive elements, such as a reflective layer separation portion, a reflective film, an adhesive and the like, which will be described in the sections regarding a lighting device shown in FIG. 20, can be omitted.

That is, a first optical image of FIG. 17(a) may be obtained using a part of the lighting device 300 of FIG. 5. That is, the first optical image of FIG. 17(a) is obtained in such a manner that the lighting device including the reflective film (see reference numeral 12 of FIG. 20) limits and guides beams irradiated from nine light sources arranged in a single line and including two LED elements, respectively, via the patterns of the three-dimensional forming portion, thereby expressing various line shaped beams with the three-dimensional effect traveling to the first path, respectively while having a predetermined optical width in an optical path (the first path) vertical to the pattern extension directions.

Here, various three-dimensional effect beams refer to a form in which nine beams having two rays of light travel from the right to the left, a length of an optical path increases and luminous intensity thereof reduces in a gradation form.

The second optical image of FIG. 17(b) is an optical image obtained through the lighting device in which the reflective coating layer is formed without a reflective film which will be described in the sections regarding FIG. 20. That is, the lighting device implements light irradiated from nine light sources arranged in one line and including two LED elements, respectively as various line shaped beams with a three-dimensional effect traveling in the first path vertical to the extension directions of the patterns by being limited and guided by the reflective coating layer and the patterns of the three-dimensional effect forming portion.

The second optical image is substantially identical to the first optical image except for the fact that a bright part of the ray of light shown in the second optical image has a length shorter than that of a bright part of the ray of light shown in the first optical image. In practice, the second optical image, namely, the length of the bright part of the ray of light may be adjusted according to a design of the reflective portion in which the entire reflective coating layer is provided as a total reflection coating layer or the reflective coating layer is provided a partial reflection coating layer having predetermined transmissivity.

The partial reflection coating layer may be provided in a form in which the entire reflective portion has predetermined transmissivity, a form in which a part of the reflective portion is disposed as a total reflection coating layer, and the remaining part is disposed as a partial reflection coating layer, or a form in which the total reflection coating layer and the partial reflection coating layer are arranged in a state of being regularly or non-regularly mixed.

Figure 18:
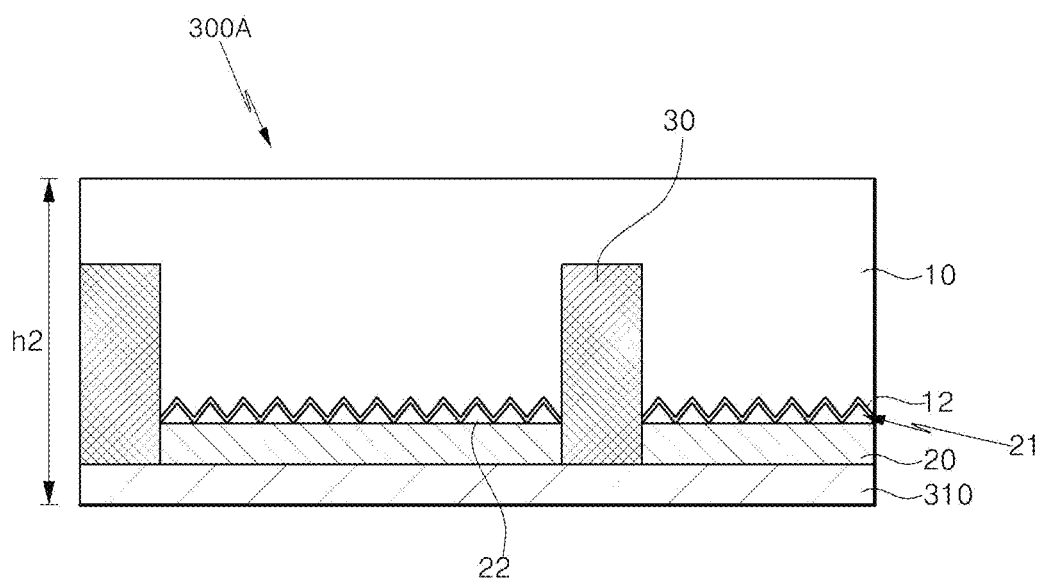
FIG. 18 is a partially enlarged cross-sectional view having a structure which can be applied to the lighting device of FIG. 17.

FIG. 18 is a partially enlarged cross-sectional view having a structure which can be applied to the lighting device of FIG. 17.

Referring to FIG. 18, a lighting device 300A according to the present embodiment is configured to include: a light guide portion 10, a three-dimensional forming portion 21, a reflective portion 12 and a light source portion 30.

The three-dimensional effect forming portion 21 may include the multiple patterns 22 provided on one surface of a separate pattern layer. The type of patterns for the multiple patterns 22 may have various shapes such as lenticular shape, a tetrahedral shape, a conical shape and the like in addition to a prism shape.

When the multiple patterns 22 of the three-dimensional effect forming portion 21 are disposed between the pattern layer 20 and the light guide portion 10, the multiple patterns 22 may not properly serve as patterns having inclined surfaces due to the resin layer constituting the light guide portion 10. In particular, when the refractive index of the light guide portion 10 is similar to that of the pattern layer 20, for example, when a difference in the refractive index therebetween is 0.2 or less, the respective inclined surfaces of the patterns positioned therebetween do not property perform a refraction and reflection operation of the incident beam. This means that line shaped beams with a three-dimensional effect may not be implemented because light of the light source portion 30 may not be guided by the multiple patterns 22 of the three-dimensional effect forming portion 21 to an upper side of the light guide portion 10.

Accordingly, the lighting device 300A guides light of the light source portion 30 according to each inclination angle of the inclined surfaces of the multiple patterns 22 and each incidence angle of the incident beams traveling in the inside of the light guide portion 10

According to the inclination angles of the inclined surfaces of the multiple patterns 22, and the incidence angles of the incident beams, the beams of the light source portion 30 or the incident beams traveling the inside of the light guide portion 10 are effectively sequentially reflected via the reflective portion 12 on the multiple patterns 22 to be guide to an upper side of the light guide portion 10.

The reflective portion 12 is a coating layer in which the multiple patterns 22 are thinly coated with a reflective material. Ag, Al, stainless steel (304SS) and the like may be used as a material of the reflective portion 12.

The light source portion 30 may further include a printed circuit board for drive of the light source and power supply, and the printed circuit board may be provided at the support member 310.

The lighting device 300A of the present embodiment may be substantially identical to a lighting device of FIG. 20 which will be described later, except for the fact that the multiple patterns 22 are provided between the pattern layer 20 and the light guide portion 10, and the reflective portion 12 in a coating layer form is provided on the multiple patterns 22.

A thickness h2 of the lighting device 300A is 100 to 250 µm or less. When the thickness of the lighting device 300A is smaller than 100 µm it is difficult to implement LED light sources in a structure in which a resin layer is buried, and durability may be reduced. Also, when the thickness of the lighting device 300A is larger than 250 µm the thickness becomes thick, and accordingly, it may be difficult to wind it on a roll.

Figure 19:
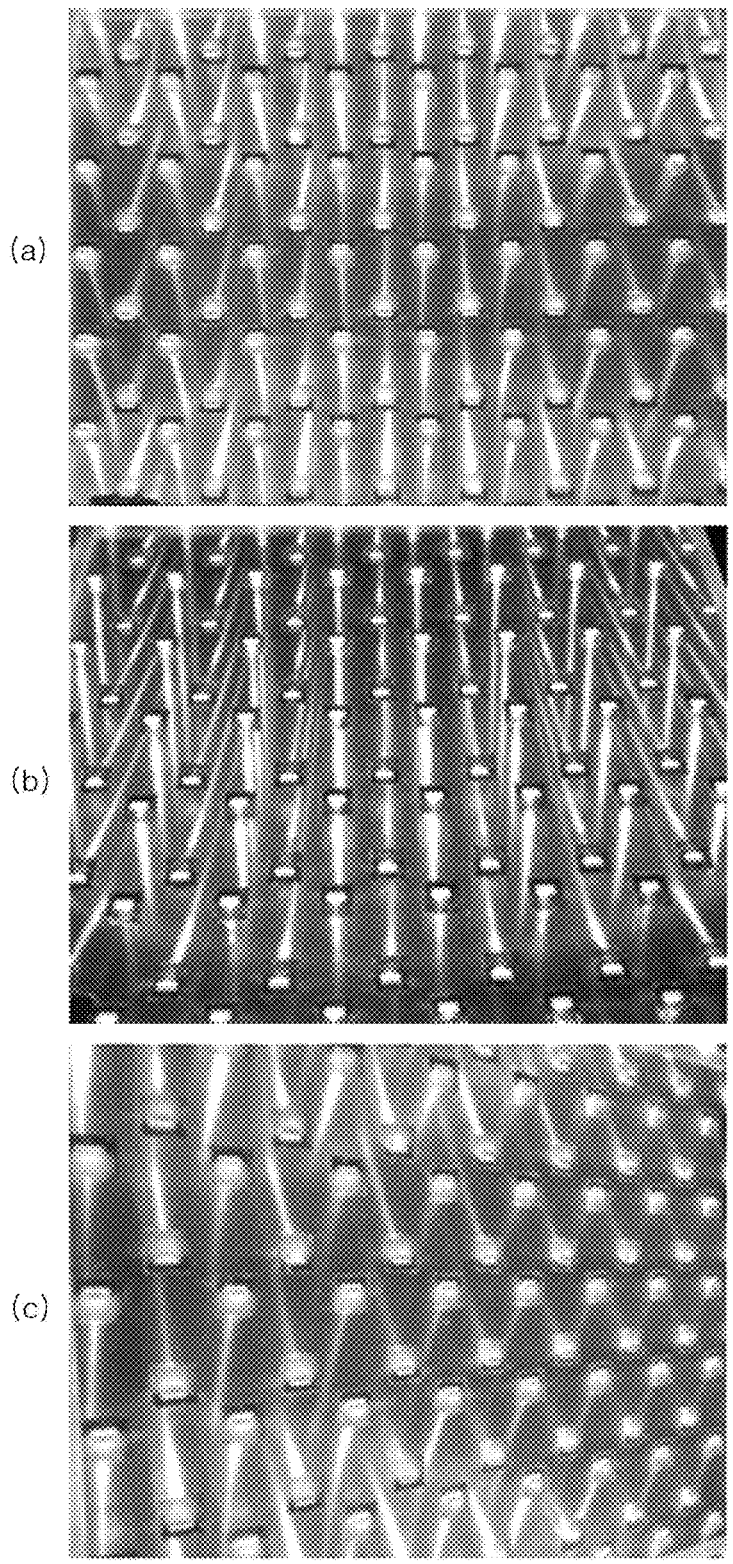
FIG. 19 is an operation state view of a lighting device according to still another embodiment of the present disclosure.

FIG. 19 is an operational state view of a lighting device according to still another embodiment of the present disclosure.

Referring to FIG. 19, the lighting device according to the present embodiment is configured to include a plurality of LED elements regularly arranged as light sources. The LED elements include first LED elements adjacent to each other on a first arrangement line and second LED elements on a second arrangement line, and at this time, a light emitting direction of the first LED elements and a light emitting direction of the second LED elements are set to direct to opposite directions. Furthermore, it is assumed that each of the first and second LED elements irradiates light to a hemispherical area on the basis of roughly the light emitting surface.

According to the aforesaid lighting device, beams of each of the LED elements are sequentially emitted to the outside while crossing the pattern arrangement surface of the patterns beyond a critical angle by reflection and refraction from the patterns of the three-dimensional effect forming portion which are arranged to be sequentially far away from the respectively LED elements. According to such a configuration, the lighting device may form various optical images of the line shaped beams having the three-dimensional effect on the three-dimensional forming portion corresponding to the respective LED elements.

The line shaped beam with the three-dimensional effect expresses different optical images of different optical paths as an observing point of an observer or a predetermined standard point is moved. As one example, the optical images of the lighting device are expressed as illustrated in (a) of FIG. 19, as viewed from a front upper side in a state of the lighting device being placed on a flat bottom.

That is, the optical images of FIG. 19(a) are expressed as optical images in which a first line shaped beam group and a second line shaped beam group of two groups of the LED elements for irradiating light in opposite directions cross in directions facing each other like folding two hands, and in which a crossing angle is gradually increased from a central area to areas of both sides of the left and the right.

Also, the optical images of FIG. 19(a) are expressed so that light emitted from the LED elements positioned at adjacent arrangement lines according to a difference in a viewing angle with respect to the respective LED elements has an angle (for example, about 180°±45°) beyond a predetermine part from opposite directions rather than being irradiated in the opposite directions.

When viewing the lighting device from a front lower side near to a flat bottom where the lighting device is placed, optical images of the lighting device are expressed as illustrated in (b) of FIG. 19. That is, when the optical images of FIG. 19(b) are compared to those of FIG. 19(a), the line shaped beams of the multiple LED elements in the same arrangement line appear to be separated from each other rather than overlapping to each other in a direction roughly vertical to the pattern arrangement surface, so that the line shaped beams can be expressed as optical images having a higher perceptional depth or a three-dimensional effect as a whole.

Furthermore, when viewing the lighting device from the lower part of a side close to the flat bottom where the lighting device is placed, optical images of the lighting device are expressed as illustrated in (c) of FIG. 19. That is, the optical images of FIG. 19(c) are expressed as optical images in which beams in adjacent areas do not cross each other and extend in a zigzag form in multiple lines side by side as the beams gradually travel near to far areas.

As such, the lighting device of the present embodiment may implement optical images different from each other of different optical paths according to a change of an observing point of an observer or a predetermined standard point.

FIG. 20 is a partially enlarged cross-sectional view having a structure which can be applied to the lighting device of FIG. 19.

Referring to FIG. 20, a lighting device 300B according to the present embodiment is configured to include the light guide portion 10, the three-dimensional forming portion 21, the reflective portion 12 and the light source portion 30.

The light guide portion 10 is made of a material which enables guiding of internal an incident beam. The material of the light guide portion 10 may be resin. When a resin layer is used as the light guide portion, the light guide portion 10 may have a thin thickness and bendable flexibility.

The resin layer is basically made of a resin material which enables guiding of light. The resin layer may be made of ultraviolet curable resin including an oligomer. Also, the resin layer may be made of resin including a urethane acrylate oligomer as a main material. For example, the resin layer may be produced by using the urethane acrylate oligomer as a synthetic oligomer and a polyacrylic polymer. Of course, the resin layer may further contain a monomer mixed with IBOA (isobornyl acrylate), HPA (hydroxylpropyl acrylate), 2-HEA (2-hydroxyethyl arrylate) and the like which are low boiling point and diluted type reactive monomers. Also, a photo initiator or an antioxidant may be further mixed as an additive.

The three-dimensional effect forming portion 21 is configured to include the multiple patterns 22. Each of the multiple patterns 22 has an inclined surface, and the inclined surface is a mirror-like finishing surface having a smooth surface roughness beyond a predetermined level. In the present embodiment, the three-dimensional effect forming portion 21 is provided by a separate pattern layer 20 bonded to one surface of the light guide portion 21. The other surface of the pattern layer 20 is bonded to one surface of the light guide portion 21, and one surface of the pattern layer is a pattern arraignment surface on which the multiple patterns 22 are provided.

The reflective portion 12 is provided as a reflective in a film form on an pattern arrangement surface of the pattern layer 20. The reflective portion 12 is formed of a material having high reflection efficiency to reflect light emitted from the light source portion 30 via the three-dimensional forming portion 21 to the side on the three-dimensional forming portion 21 so that light loss can be reduced and a line shaped beam having an three-dimensional effect can be more clearly expressed.

In order to increase a reflection property of light and a dispersion property of light, a synthetic resin in which a white pigment is diffused and contained may be used as a material of the reflective portion 12. For example, titanium oxide, aluminum oxide, zinc oxide, lead carbonate, barium sulfate, calcium carbonate and the like may be used as the white pigment. Polyethylene terephthalate, polyethylene naphtaenate, acryl resin, poly carbonate, polystyrene, polyolefin, cellulose acetate, weather resistant vinyl chloride and the like may be used as the synthetic resin, but the present disclosure is not limited thereto.

A reflective layer separation portion 120 may be provided between the reflective portion 12 and the multiple patterns 22. The reflective layer separation portion 120 may be an air gap filled with air, but is not limited thereto. According to some embodiments, the reflective layer separation portion 120 may be filled with a material having a different refractive index from that of the pattern layer 20.

Also, the reflection portion 12 may be adhered to the pattern layer 20 via predetermined adhesive patterns 130 upon lamination on the pattern layer 20. In this case, the reflective portion 12 may contribute diversity of optical images by controlling an amount or a position of light reflected from the reflective portion 12 according to a refractive index, a reflection ability of the adhesive patterns Also, the lighting device 300B according to the present embodiment may further include reflective patterns 140 on the reflective portion 12. The reflective patterns 140 may be provided on one surface of the reflective portion 12 facing the pattern layer 20 using an ink patterns. The same material as that of the reflective portion 12 may be used as a material of the reflective patterns 140. When the reflective patterns 140 are used, the intensity of light reflected from the reflective portion 12 can be adjusted, thereby contributing to implementation of optical images having various shapes.

The light source portion 30 includes light sources. The light sources may be configured to include one or two or more light emitting diode (LED) elements. The LED element may have a side view type or an upper view type light emitting structure. Also, the light source portion 30 may be configured to include a separate printed circuit board 32. The printed circuit board 32 may be a flexible printed circuit board in which conductive circuit patterns are provided on a flexible insulating substrate. In the present embodiment, as viewed from a cross section of the light source portion, the light source of the light source portion 30 may be connected to the printed circuit board 32 in such a form as to pass through the pattern layer 20 and the reflective portion 12, and may be driven so as to irradiate light to the three-dimensional forming portion using power supplied through the printed circuit board 32 and a control signal.

According to the present embodiment, in the lighting device 300B, when the reflective portion 12 on the printed circuit board 32, the pattern layer 20 and the light source of the light source portion 30 are buried by the light guide portion 10, the light of the light source portion 30 is guided by the light guide portion 10, and the multiple patterns 22 of the three-dimensional effect forming portion 21 express line shaped beams using reflection and refraction, the line shaped beams may be more clearly implemented by reflection from the reflective portion 12.

Also, line shaped beams having various shapes or optical images having desired shapes using the line shaped beams may be more efficiently implemented by controlling light reflection ability or a reflection area of the reflective portion 12 using the reflection patterns 140 or the adhesive patterns 130 of the reflective portion 12.

FIG. 21 is a plan view showing reflective patterns which can be applied to the lighting device of FIG. 19.

Referring to FIG. 21, according to the lighting device according to the present embodiment, the reflective patterns 140 may be provided in a form in which unit patterns 141 having a hexagonal ring-like shape are arranged in plural number, but is not limited thereto. For example, in addition to the hexagonal shape, the reflective patterns 140 may be designed in a polygonal shape, a circular shape, an elliptical shape, a star-like shape, a winding ring-like shape, a stripe shape, a mesh shape or a combination thereof. That is, the pattern shape of each of the reflective patterns 140 may be designed according to optical images having a desired shape or desired three-dimensional effects (clearness, haziness, spreading, and the like) with respect to the optical images.

The reflective patterns 140 may be formed by printing an ink including a reflective material on one surface of the reflective portion 12.

When the reflective patterns 140 are used, by reflecting some beams traveling to a lower side of the three-dimensional effect forming portion via the three-dimensional effect forming portion (see reference numeral 21 of FIG. 20) from the light source 30 and returning the reflected beams to the three-dimensional effect forming portion, all beams of the light source portion may be emitted to an upper side of the light guide portion 10 in the first path via the multiple patterns of the three-dimensional effect forming portion. Also, optical images of the line shaped beams with the three-dimensional effect may be variously changed by adjusting a reflection amount or a reflection area of light according to a design of the reflective pattern 140.

Meanwhile, the adhesive pattern 130 provided on one surface of the reflective portion (reference numeral 12 of FIG. 20) along the reflective pattern 140 may be provided in separate patterns which overlap with or do not overlap with the reflective pattern 140 without being limited thereto. According to some embodiments, the adhesive pattern 130 may be provided by containing a predetermined adhesive component into the reflective pattern 140. In this case, the reflective pattern 140 may be the adhesive pattern 130.

FIG. 22 is a cross-sectional view of a lighting device according to still another embodiment of the present disclosure.

Referring to FIG. 22, a lighting device 400 according to the present embodiment is configured to include: the light guide portion 10, the reflective portion 12, the three-dimensional effect forming portion 21, the light source portion 30 and a support member 410. The light guide portion 10, the three-dimensional forming portion 21 and the reflective portion 12 may be provided as a single optical member of a sheet phase.

The light guide portion 10, the three-dimensional effect forming portion 21 and the reflective portion 12 of the present embodiment may be substantially identical to those of any one of the aforesaid embodiments, except for the fact that the three-dimensional effect forming portion 21 is provided in an uneven-like shape formed by removing a part of one surface of the light guide portion 10, and the reflective portion 12 of a sheet phase is provided on one surface of the light guide portion 10.

In the present embodiment, a thickness of the light guide portion 10 is about 100 to 250 μm or less. When the thickness of the light guide portion 10 is smaller than 100 μm it is difficult to manufacture an LED light source having a height of a light emitting surface smaller than 100 μm and durability may be largely reduced. Also, when the thickness of the light guide portion 10 is larger than 250 μm flexibility is reduced, so that it may be difficult to install the light guide portion at the support member 410 have a predetermined curvature R2.

The light source portion 30 is disposed on one side of the light guide portion 10, thereby supplying the incident beam to one side of the light guide portion. The light source portion 30 may be provided as an LED package including one or two or more LED elements.

The support member 410 may be a housing having a predetermined curvature such as 1/R and the like, a wall inside or outside a building having a bent portion, or one surface of a product. In the present embodiment, the support member 410 has a hollow type cylindrical shape having a predetermined diameter 2R.

The support member 410 may be implemented using devices or products without being specially limited if the devices or products enable the light guide portion 10 of a sheet phase and the three-dimensional forming portion 21 to be disposed on one side of the light source portion 30 to which light is irradiated. Furthermore, the support member 410 may be implemented using a circular or hollow cap, clothing, shoes, bag, accessory, indoor and outdoor interior parts and the like.

According to the present embodiment, the light guide portion and the three-dimensional effect forming portion are disposed in an application product, an article or a building having a curvature so that illumination of various optical designs may be implemented by line shaped beams or line shaped beams with a three-dimensional effect.

FIG. 23 is a plan view of a lighting device according to still another embodiment of the present disclosure.

Referring to FIG. 23, a lighting device 500 according to the present embodiment is configured to include: a light guide portion, a reflective portion, a three-dimensional effect forming portion, a light source portion and an outer lens 510.

The light guide portion 10 may be substantially identical to the light guide portions of the lighting devices previously described with reference to FIGS. 1 to 20, except for the light guide portion has a streamlined shape as viewed from a plane and has a curvature from a fixed portion in a thickness direction.

The three-dimensional forming portion is configured to include multiple group patterns 22a, 22f, 22g and the like provided in areas different from each other. The multiple patterns are disposed in areas different from each other of the streamlined light guide portion 10 so as to implement line shaped beams having different optical paths y1, y2, y3, y4, y5, y6, y7. The multiple patterns may be implemented as uneven patterns integrally provided with one surface of the light guide portion 10 or uneven patterns provided by a separate pattern layer.

The reflective portion may be a coating layer on uneven patterns integrally formed on one surface of the light guide portion 10, but may be also implemented as a flat reflective film, a reflective layer or a reflective plate on the uneven patterns provided by the separate pattern layer. Of course, the reflective portion may further include reflective patterns on a flat reflective film.

The light source portion 30 includes multiple light sources 30a, 30b, 30c, 30d, 30e, 30f, 30g arranged at an edge of one surface along a streamlined shape of the light guide portion 10.

The light guide portion, the three-dimensional effect forming portion, the reflective portion and the light guide portion may be substantially identical to the lighting device 300A of FIG. 21 or the lighting device 300B of FIG. 23 except for the fact that the light guide portion has the streamlined shape.

When the lighting device 500 is used for illumination for a vehicle, the light source of the light source portion 30 may be operated by power supplied from a battery 520 of the vehicle.

The light guide portion 10, the three-dimensional effect forming portion and the reflective portion are arranged on one surface of an outer lens 510. The light guide portion 10 may be bonded to one surface of the outer lens 510 or may be arranged to be separated from the one surface of the outer lens by a predetermined distance. Also, the light source portion 30 may be disposed on the one surface of the outer lens 510 or on the other surface corresponding to an opposite surface of the one surface, and the light sources of the light source portion 30 may be buried in the light guide portion 10, but is not limited thereto.

The outer lens 510 refers to a lens-shaped cover disposed on an outer surface of the lighting device such as a light device for a vehicle (a headlight, a rear light and the like), an outdoor lighting device and the like. When the outer lens is used in vehicles, the outer lens 510 may be provided on one surface, in which the light guide portion 10 or the three-dimensional forming portion is disposed, so as to have a curvature leading to a curved surface of a vehicle body.

The outer lens 510 may be made of a transparent plastic material, for example, engineering plastic and the like.

According to the present embodiment, through a design of the patterns of the three-dimensional effect forming portion, it can be provided with the lighting devices useful for lighting devices for vehicles, such as a headlight, a rear light, car indoor illumination, a for lamp, a door scarf or the like. That is, in terms of a volume, a thickness, a weight, a price, a life span, stability, a degree of freedom in design, and easiness of installation, the lighting device 500 of the present embodiment may be usefully applied compared to the existing lamps for vehicles.

Meanwhile, the lighting device 500 of the present embodiment is not limited to a lighting device for vehicles, and may be applied to a curve portion or a bent portion inside or outside an object for illustration installation, such as a building, equipment, furniture and the like, as a flexible lighting device in a film form. In this case, the outer lens 510 may be a support member or a housing for supporting the light guide portion, the optical member and/or the light source portion combined with the light guide portion, the three-dimensional effect forming portion and the reflective portion. In this case, the outer lens 510 may have light transmittance or transparency beyond a predetermined level for enabling the inside to be visible from the outside.

As set forth above, some embodiments of the present disclosure may provide the lighting device capable of implementing optical images having desired shapes using a line shaped beam by controlling an optical path, an optical width and a change in brightness through a pattern design to create the line shaped beam.

According to some embodiments of the present disclosure, it can be provided with the lighting devices which can be easily utilized to various application products regarding illumination by adopting an optical member in a film form to make an entire thickness of the device thin.

According to some embodiments of the present disclosure, flexibility is provided to the lighting device by using a flexible printed circuit board and a resin layer so that a degree of freedom in product design can be improved, and reliability can be secured.

According to some embodiments of the present disclosure, various optical images having three-dimensional effects and desired shapes can be implemented in various lighting fields such as general lighting, design lighting, vehicle lighting and the like, and the lighting devices capable of being produced on a mass production basis can be provided at low costs.

As previously described, in the detailed description of the disclosure, having described the detailed exemplary embodiments of the disclosure, it should be apparent that modifications and variations can be made by persons skilled without deviating from the spirit or scope of the disclosure. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents.

An aspect of embodiments of the present disclosure provides a lighting device capable of implementing optical images having desired shapes using a line shaped beam by controlling an optical path, an optical width and a change in brightness using a pattern design to create the line shaped beam.

Another aspect of embodiment of the present disclosure may provide a lighting device using a line shaped beam which enables an entire thickness of the device to become thinner.

A further aspect of embodiments of the present disclosure may provide a lighting device that can improve the degree of freedom in product design and can also ensure reliability of the product by forming the lighting device including a printed circuit board or an optical member so as to have flexibility.

Yet another aspect of embodiments of the present disclosure may provide a lighting device that can implement optical images in various shapes having a three-dimensional effect in various lighting fields, such as general lighting, design lighting, car lighting and the like.

In order to solve the above problems, according to an aspect of the present disclosure, a lighting device may include: a light source portion having at least one light source; a light guide portion having a larger thickness than a height of a light emitting surface of the light source and irradiated by an incident beam of the light source from a side; a three-dimensional effect forming portion provided inside the light guide portion, on a first surface of the light guide portion or a second surface opposite to the first surface; and a reflective portion on the light guide portion or the three-dimensional effect forming portion. Here, the three-dimensional effect forming portion includes multiple patterns sequentially arranged and having respective inclined surfaces with inclination angles, and the multiple patterns guide light passing along the light guide portion in a first surface direction toward which the first surface looks, or in a second surface direction toward which the second surface looks by using refraction and reflection of the respective inclined surfaces, thereby implementing line shaped beams of a first path crossing at right angles to respective extension directions of the multiple patterns.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
   a light source portion having at least one light source; and
   a light guide portion having a larger thickness than a height of a light emitting surface of the at least one light source and irradiated by an incident beam of the at least one light source from a side, the light guide portion having a first surface and a second surface opposite the first surface,
   wherein the first surface of the light guide portion includes a three-dimensional effect forming portion at which a three-dimensional light effect is formed,
   wherein a flat reflective portion provided to face the second surface of the light guide portion,
   wherein the three-dimensional effect forming portion includes multiple patterns sequentially arranged in a first direction and having respective inclined surfaces with inclination angles with respect to the first surface,
   wherein each of the multiple patterns extends parallel in a line in a second direction vertical to the first direction,
   wherein the multiple patterns guide light passing along the light guide portion into a first surface direction toward which the first surface faces by using refraction and reflection from the inclined surfaces,
   wherein the first surface of the light guide portion is a light exiting surface and the second surface of the light guide portion is flat,
   wherein a spaced portion is provided as air gaps between the flat reflective portion and the second surface of the light guide portion,
   wherein each of the multiple patterns include a plurality of recesses, a vertical cross-section of each recess having five sides with different angles of inclination, and
   wherein one side of the five sides includes an interrupted surface configured to block light from being emitted through at least one of reflection or refraction.

2. The lighting device of claim 1, wherein the reflective portion is provided a coating layer or a reflective film.

3. The lighting device of claim 2, wherein the reflective film has reflective patterns.

4. The lighting device of claim 2, wherein a material of the reflective portion includes any one of Ag, Al, $TiO_2$, $CaCO_3$, $BaSO_4$, $Al_2O_3$, silicon, polystyrene (PS), and a white sheet.

5. The lighting device of claim 1, wherein a material of the light guide portion is resin or glass including a thermoplastic polymer or a photocurable polymer.

6. The lighting device of claim 5, wherein a material of the light guide portion includes polycarbonate, polymethylmethacrylate, polystyrene or polyethylene terephthalate.

7. The lighting device of claim 1, wherein the reflective portion comprises:
   reflective patterns having a plurality of unit patterns,
   wherein the plurality of unit patterns has a ring shape.

8. The lighting device of claim 7, wherein the reflective portion, the three-dimensional effect forming portion, and the at least one light source of the light source portion are all inside the light guide portion.

9. The lighting device of claim 1, wherein the pattern extension directions are parallel to each other or cross each other, and in the case where the pattern extension directions cross each other, the first path is bent with a curvature to a side in which the pattern extension directions cross each other.

10. The lighting device of claim 1, wherein the inclined surface is a mirror-like finishing surface and has an arithmetic mean roughness (Ra) of 0.02 or less and a maximum height roughness (Ry) of 0.30 or less.

11. The lighting device of claim 1, wherein a distance between two adjacent patterns among the multiple patterns is 10 to 500 μm.

12. The lighting device of claim 1, wherein a thickness of the light guide portion is 0.1 mm or more and 10.0 mm or less.

13. The lighting device of claim 1, wherein a thickness of the light guide portion is 250 μm or less.

14. The lighting device of claim 1, wherein the three-dimensional effect forming portion is provided by removing a part of the first surface of the light guide portion or is provided as a pattern layer bonded to the first surface.

15. The lighting device of claim 1, wherein the light source and the three-dimensional effect forming portion are provided within the light guide portion.

16. The lighting device of claim 1, wherein the light source portion comprises a first light source and a second light source, the first light source and the second light source irradiating light from the same direction to directions parallel to each other or irradiating light from the same direction to directions crossing each other.

17. The lighting device of claim 1, wherein the light source portion comprises a first light source and a second light source, the first light source and the second light source irradiating light from opposite directions to a straight line direction or directions parallel to each other, or irradiating light to different directions having an angle of more than 90° and less than 180° between the first light source and the second light source.

18. The lighting device of claim 1, wherein the at least one light source includes at least one LED package having one or two or more LED elements and irradiates light to a hemispherical area based on a light emitting surface of the respective at least one light source.

* * * * *